United States Patent [19]
Kokuga et al.

[11] Patent Number: 5,606,240
[45] Date of Patent: Feb. 25, 1997

[54] BATTERY CHARGER

[75] Inventors: Toshiharu Kokuga; Mikitaka Tamai; Tetsuya Okada, all of Sumoto, Japan

[73] Assignee: Sanyo Electric Co., Ltd., Osaka, Japan

[21] Appl. No.: 530,439

[22] Filed: Sep. 19, 1995

Related U.S. Application Data

[63] Continuation of Ser. No. 93,872, Jul. 20, 1993, abandoned.

[30] Foreign Application Priority Data

Jul. 21, 1992 [JP] Japan .................. 4-194020
Apr. 26, 1993 [JP] Japan .................. 5-099384
Apr. 28, 1993 [JP] Japan .................. 5-102574

[51] Int. Cl.$^6$ ........................ H02J 7/04
[52] U.S. Cl. ............... 320/32; 320/23; 320/35; 320/39
[58] Field of Search ............... 320/5, 14, 22, 320/32

[56] References Cited

U.S. PATENT DOCUMENTS

| | | | |
|---|---|---|---|
| 3,864,617 | 2/1975 | Smith et al. | 320/23 |
| 4,061,956 | 12/1977 | Brown et al. | 320/22 |
| 4,237,411 | 12/1980 | Kothe et al. | 320/21 |
| 4,385,269 | 5/1983 | Aspinwall et al. | 320/14 |
| 4,394,611 | 7/1983 | Fallon et al. | 320/21 |
| 4,418,310 | 11/1983 | Boilinger | 320/39 |
| 4,609,861 | 9/1986 | Inaniwa et al. | 320/32 |
| 4,626,765 | 12/1986 | Tanaka | 320/48 |
| 4,629,965 | 12/1986 | Fallon et al. | 320/39 |
| 4,680,528 | 7/1987 | Mikami et al. | 320/32 |
| 4,952,861 | 8/1990 | Horn | 320/23 |
| 5,028,860 | 7/1991 | Amano | 320/23 |
| 5,172,044 | 12/1992 | Sasaki et al. | 320/22 |
| 5,175,485 | 12/1992 | Joo | 320/32 |
| 5,237,259 | 8/1993 | Sanpei | 320/23 |
| 5,307,000 | 4/1994 | Podrazhansky et al. | 320/14 |
| 5,363,031 | 11/1994 | Miller et al. | 320/21 |

FOREIGN PATENT DOCUMENTS 4-88836 3/1992 Japan .

Primary Examiner—Steven L. Stephan
Assistant Examiner—Nicholas Ponomarenko
Attorney, Agent, or Firm—Wenderoth, Lind & Ponack

[57] ABSTRACT

A battery charger has a battery capacity detector for detecting the remaining battery capacity and a timer setter for controlling the timer setting that determines the battery charging time based on the results from the battery capacity detector. The battery capacity detector measures the battery voltage, the battery constant current charging time, or the battery capacity. The timer includes a protection timer to forcibly end battery charging and a constant current charging timer to establish the constant current charging interval.

5 Claims, 18 Drawing Sheets

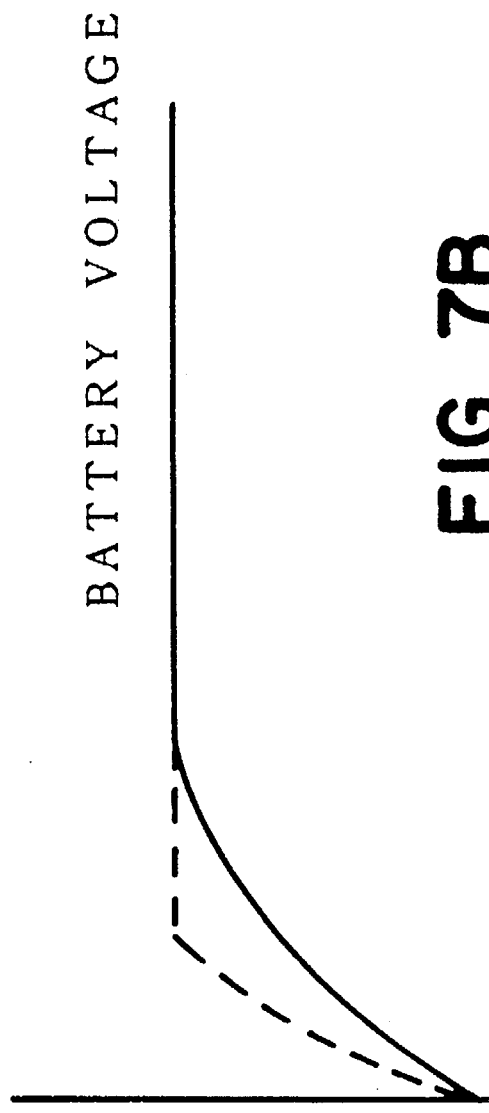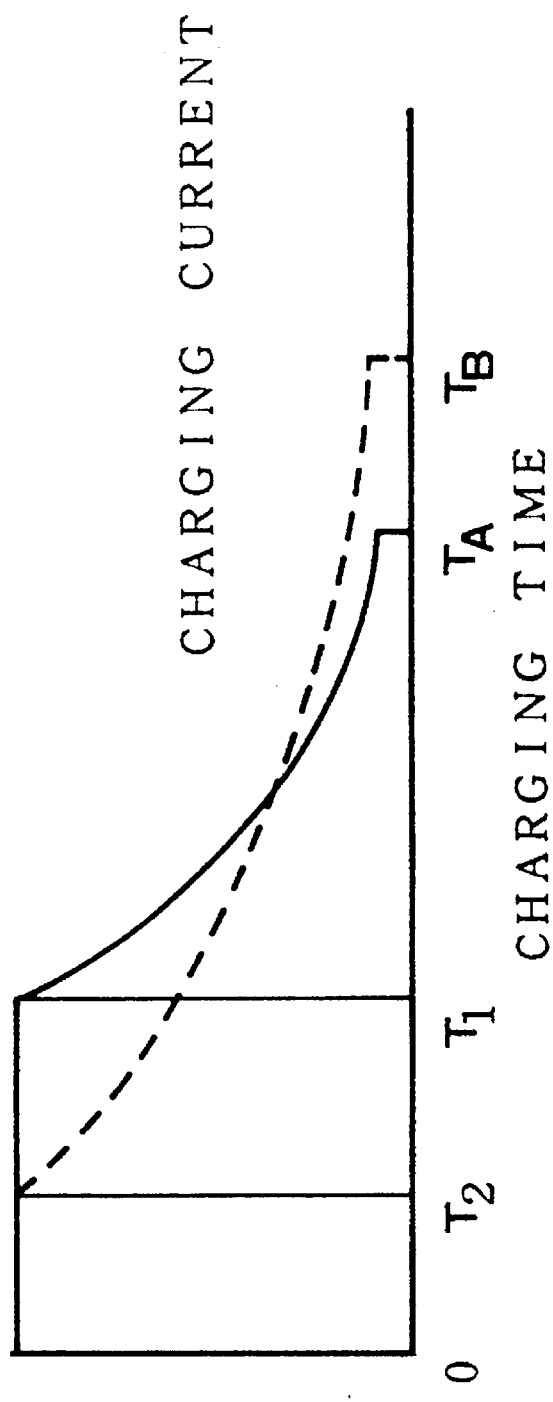

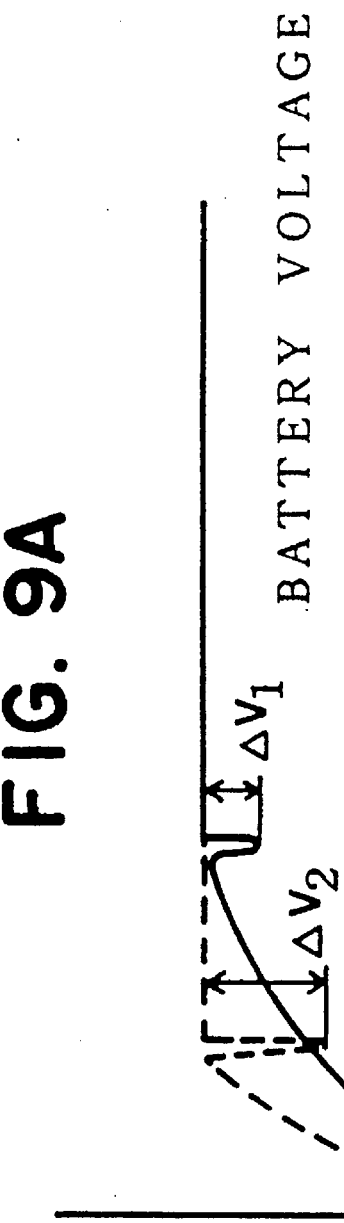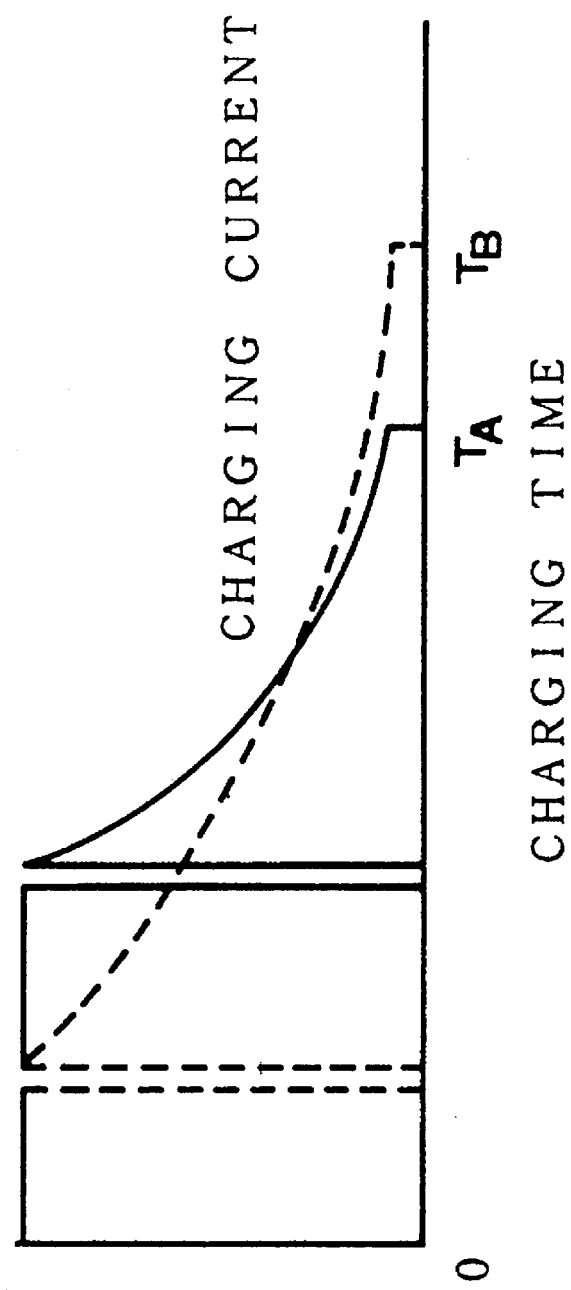

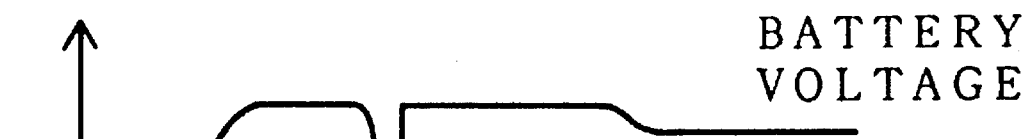
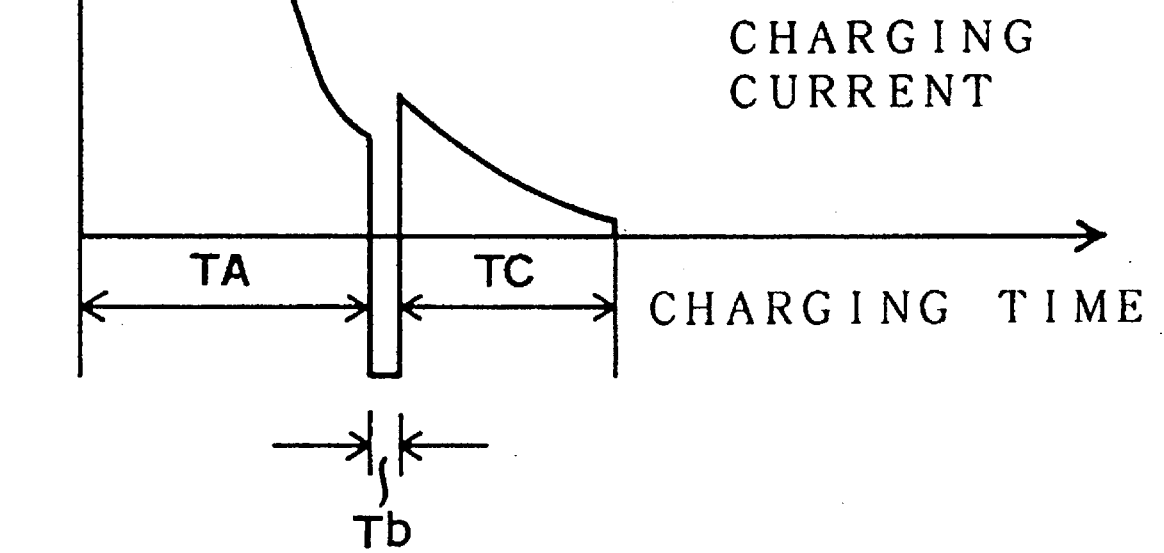

BATTERY VOLTAGE

CHARGING CURRENT

TIME

BATTERY CHARGER

This application is a Continuation of now abandoned application Ser. No. 08/093,872, filed on Jul. 20, 1993.

BACKGROUND OF THE INVENTION

This invention relates to a battery charger, and more particularly to a battery charger most suitable for charging lithium ion rechargeable batteries.

Various batteries such as lithium ion rechargeable batteries, the nickel cadmium batteries, nickel hydrogen batteries, etc. are representative of rechargeable batteries capable of repeated discharge and recharge. The lithium ion rechargeable battery is being recognized as a high capacity rechargeable battery. To optimally charge these rechargeable batteries, charging methods appropriate to the battery's characteristics have been adopted. For example, a charging method for the lithium ion rechargeable battery is described in Japanese Patent Disclosure 2-192670 (1990). In this method, the battery is charged with a constant voltage and charging is stopped when the charging current drops below a prescribed value. Otherwise in this method, the battery is first charged with a constant current until a prescribed voltage is reached then it is charged with a constant voltage and charging is stopped ceased when the charging current drops below a prescribed value. Further, for nickel cadmium and nickel hydrogen batteries, charging with a constant current is carried out until a prescribed battery voltage is reached, at which point full charge is assumed and charging is stopped.

If a battery is continually charged without restraint, battery voltage will rise abnormally high causing battery performance degradation. FIGS. 1A–1C show graphs of battery voltage and current characteristics as charging proceeds. In this figure, the characteristics of a degraded battery or a battery when ambient temperature is low are shown by the broken lines A. In other words, the lines A show characteristics for a battery with a reduced actual battery capacity. The reason that a long time is required to charge a degraded battery or one with a low ambient temperature is because a internal resistance of the battery becomes large. As shown in this when a battery is charged with a constant voltage, the charging current gradually decreases as a full charge is approached. The current approaches zero but does not become exactly zero. This small non-zero charging current is consumed in secondary reactions such as electrolyte dissociation. For this reason, when a battery is charged for a long period, for example a by constant voltage charging, the battery can be over-charged, thereby degrading its performance.

A method to limit charging time with a protection timer has been adopted to prevent over-charging. In this battery charging method, when a specified time has elasped since the start of charging, even if the full battery charge has not been detected, the charging is forced to stop by the protection timer. As reported in Japanese Patent Disclosure 4-88836 (1992), the protection timer can be set to a suitable time depending on the battery to be charged (for example, a battery of different capacity).

Further, constant current charging time can be limited by a protection timer for a charging method that stops charging at a full charge determined when the charging current drops below a prescribed level during constant voltage charging performed after the battery voltage rises above a prescribed level during the constant current charging. The constant current charging time is set such that constant current charging cannot be performed over a long period of time. When the protection timer time has elapsed, the battery charger forces the charging to cease.

As described above, the protection time of the protection timer can be appropriately set depending on the type of battery. However, this alone does not sufficiently protect the battery. This is because even for the same type of battery, the charging characteristics vary depending on the battery's remaining capacity.

FIGS. 2A–2B show the battery voltage V and charging current I versus charging time characteristics a lithium ion rechargeable battery with constant current or constant voltage charging. FIG. 2A is for the case of little remaining battery capacity and FIG. 2B is for the case of considerable remaining battery capacity.

As shown in FIG. 2A, the protection timer is set to a time TS that is capable of protecting the battery after charging it for a time just long enough to obtain a full charge from a state of a low capacity (namely, for a time TO where the charging current goes close to zero). A battery as shown in FIG. 2B with considerable remaining battery capacity charges to full charge in a short time. Since the time from TO in FIG. 2B, where the battery reaches full charge, to the time TS, where the protection timer times out, is extremely long, it is difficult to say that the protection timer's performance is sufficient.

SUMMARY OF THE INVENTION

The optimum constant current charging time for battery voltage to reach a prescribed value also varies depending on remaining battery capacity. It is thus the first primary object of the present invention to establish an optimum protection timer setting as well as an optimum constant current charging time regardless of the remaining battery capacity.

Further, for the case of the rechargeable lithium ion battery, a battery with a cycle degradation and reduced capacity also has an increased internal impedance. Therefore, even though the battery's capacity is low, the constant current charging time to reach the prescribed voltage is short. In this type of battery, a full charge cannot be obtained without lengthening the subsequent constant voltage charging time. However, usually the protection timer is set to a time capable of protecting a normal battery. Consequently, for a degraded battery, the protection timer will time out before a full charge is reached, making full charging impossible.

The second primary object of the present invention is to establish an appropriate protection timer setting depending on the state of the battery, thereby allowing proper realization of the protection function.

The battery charger in accordance with the present invention comprises a battery capacity detector for determining the battery capacity and a timer a setter for controlling the timing period which in turn controls the battery charging based on results from the battery capacity detector. The timer is provided with a protection timer to interrupt battery charging and a constant current charging timer to establish the constant current charging time. The battery capacity detector detects remaining battery capacity or it detects charging capacity, which is the actual amount the the battery can be charged to. The timer setter controls the protection timer setting or the constant current charging time depending on the remaining battery detected capacity or charging capacity. The timer setting is made long for a battery with little remaining capacity or large charging capacity and is made short for a battery with considerable remaining capacity or small charging capacity. The timer establishes the time for stopping charging or the time for constant current charging.

The above and further objects of the invention will more fully be apparent from the following detailed description with accompanying drawings.

BRIEF DESCRIPTION OF THE DRAWINGS

FIGS. 7A–7B are is characteristic curves showing the charging characteristics of an embodiment of the battery charger of the present invention.

FIGS. 9A–9B are is characteristic curves showing the charging characteristics of an embodiment of the battery charger of the present invention.

FIGS. 13A–13B are is graphs showing voltage and current change during charging of a battery by an embodiment of the battery charger of the present invention.

DETAILED DESCRIPTION OF THE INVENTION

Figure 1A:
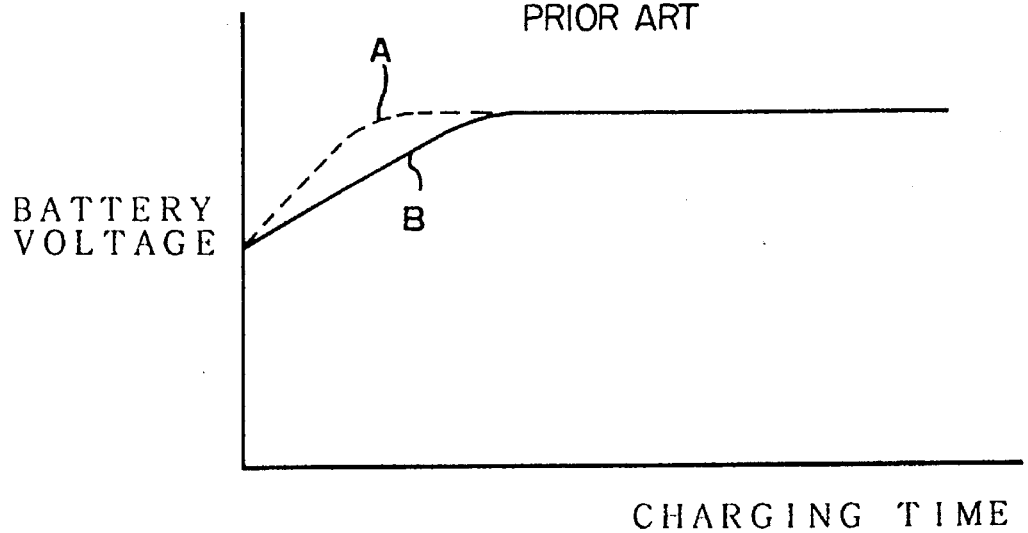
FIGS. 1A–1C are is graphs showing voltage, current, and battery capacity change during charging of a lithium ion rechargeable battery.
Figure 1B:
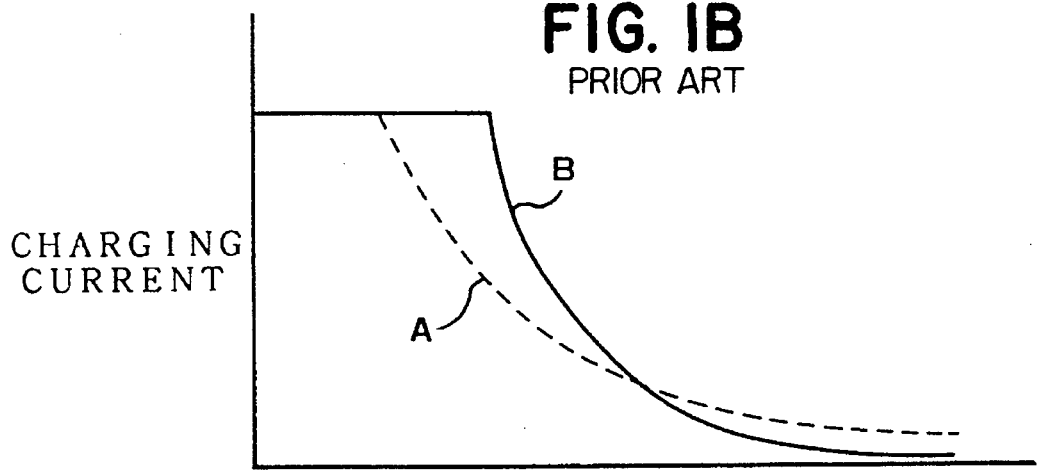
Figure 1C:
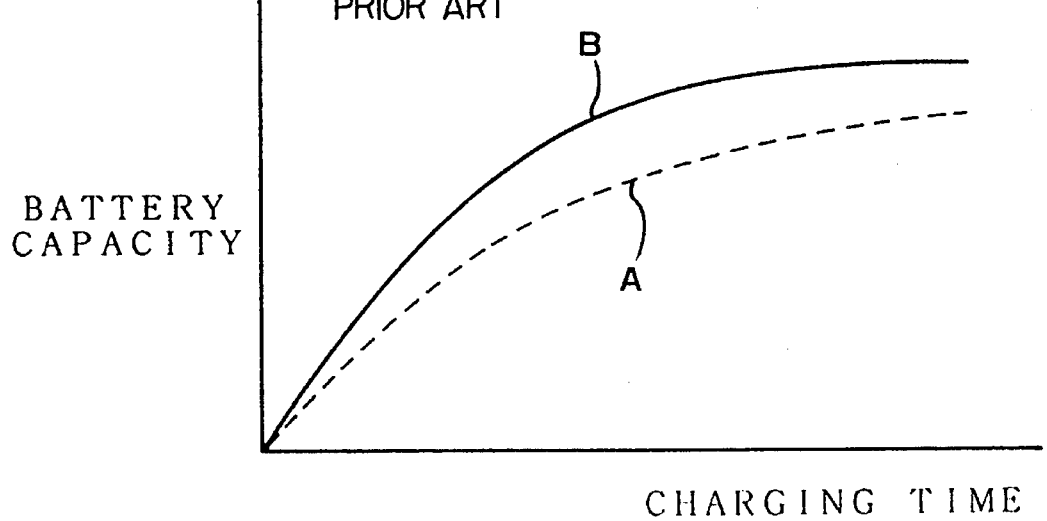
Figure 2A:
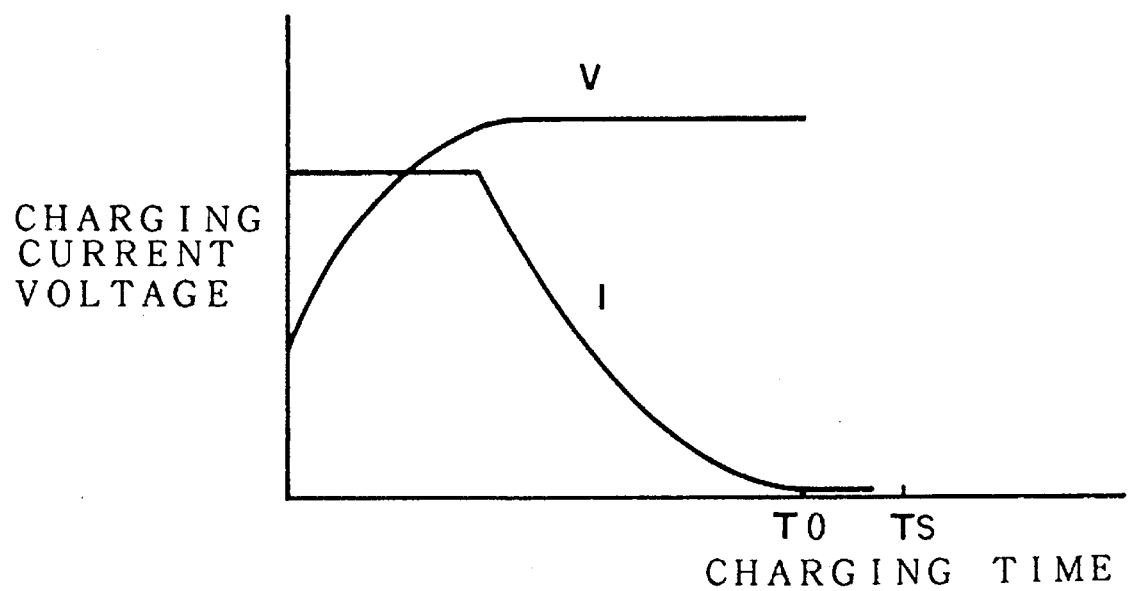
FIGS. 2A–2B are is characteristic curves showing the charging characteristics of a lithium ion rechargeable battery.
Figure 2B:
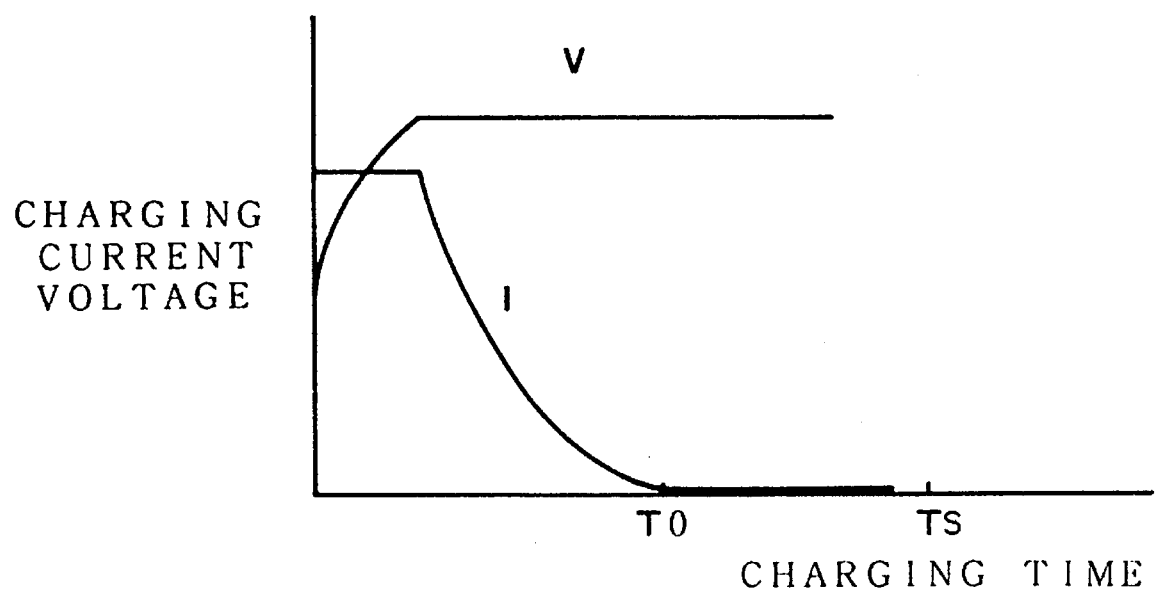
Figure 3:
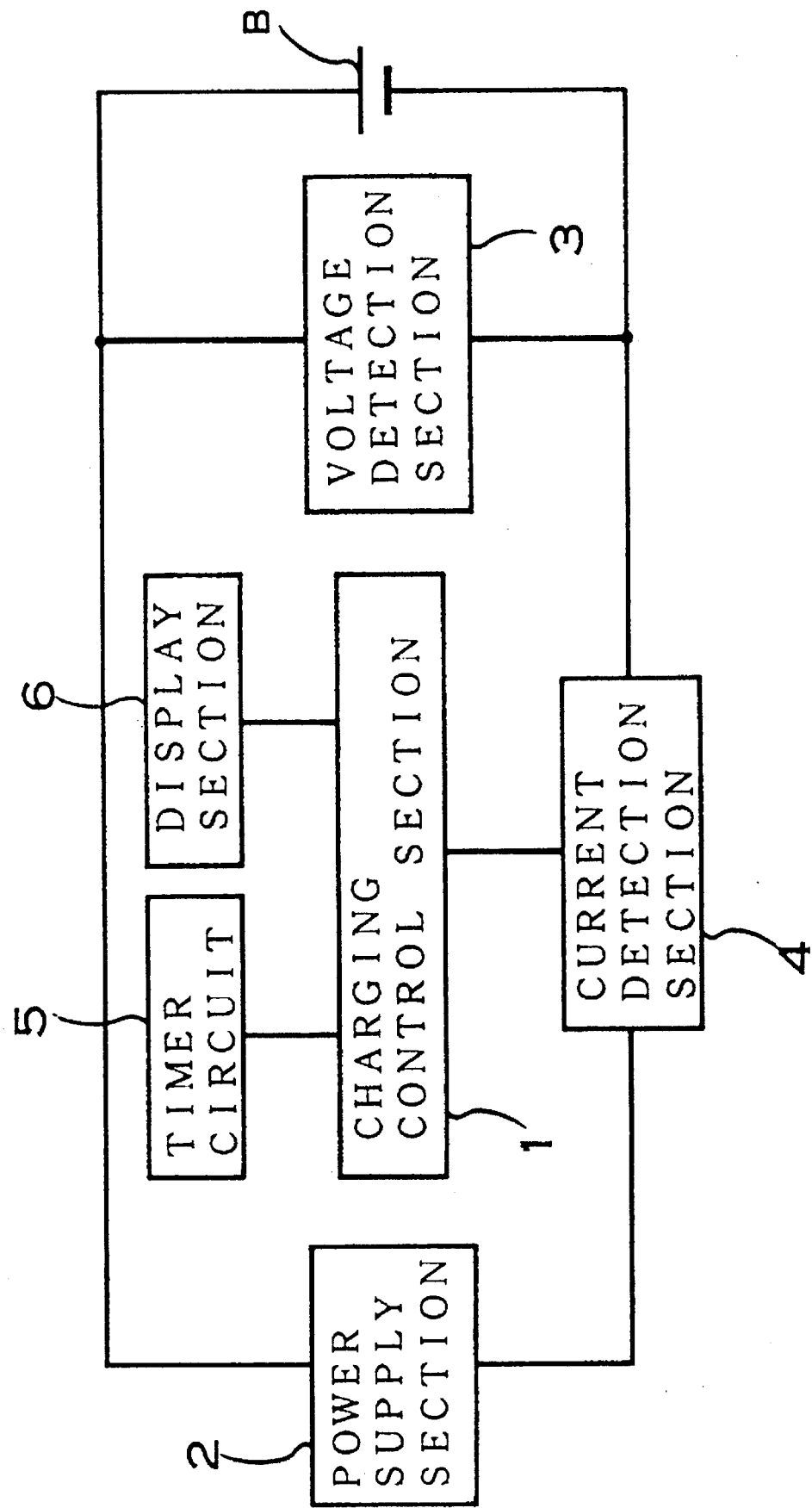
FIG. 3 is a block circuit diagram showing a first embodiment of the battery charger of the present invention.

FIG. 3 is a block diagram showing a first embodiment of the present invention. In this figure, element 1 is a charging control section. The charging control section 1 is provided with a RAM (random access memory), a ROM (read only memory) containing the charging control program and various charging conditions, a microcomputer, and other peripheral circuitry. Element B is a rechargeable lithium ion battery.

Element 2 is a power supply section which accepts AC power from a commercial power source (not illustrated) and supplies from 1C to 2C of constant current or 4.2 V of constant voltage to the battery B. The power supply section 2 charges the battery B with a constant current until a prescribed battery voltage (4.2 V) is reached; then it charges the battery B with a constant voltage.

The battery charging current may also be a quasi-steady current that gradually decreases from 2C to 1C instead of a constant current. However, the following explanation assumes the constant current case.

Element 3 is a voltage detection section which measures the voltage V of the battery B and inputs the detected voltage V into the charging control section 1. In this embodiment, the battery B is a rechargeable lithium ion battery and the remaining battery capacity is approximately proportional to the battery voltage V. Consequently, the voltage detection section 3 that measures a battery voltage V is also the capacity detector that detects the remaining battery capacity.

Element 4 is a current detection section which measures the charging current I during the charging of the battery B and inputs this to the charging control section 1 when the detected current I becomes almost zero.

Element 5 is a timer circuit. The timer circuit 5 is provided with a constant current charging timer to establish the time interval for constant current charging depending on the remaining capacity of the battery B and a protection timer to force charging to end. The constant current charging time T1 and the protection timer setting T2 are set according to battery capacity by a charging control section signal. The constant current charging timer and the protection timer begin counting when the battery B charging begins. The constant current charging time T1 and the protection timer setting T2 are inversely proportional to the remaining battery capacity and that functional relationship is stored in advance in the charging control section 1. The charging control section 1 sets the constant current charging time T1 and the protection time T2 corresponding to the battery capacity. Consequently, the charging control section 1 of this battery charger constitutes a timer setter. The charging control section 1, which is the timer setter, sets the constant current charging timer and protection timer settings of the timer circuit 5 according to the detected value of the remaining capacity of the battery B.

Element 6 is a display section of light emitting diodes (LEDs) and their driving circuitry which are used to indicate the completion of the charging of the battery B or a charging malfunction.

Figure 4:
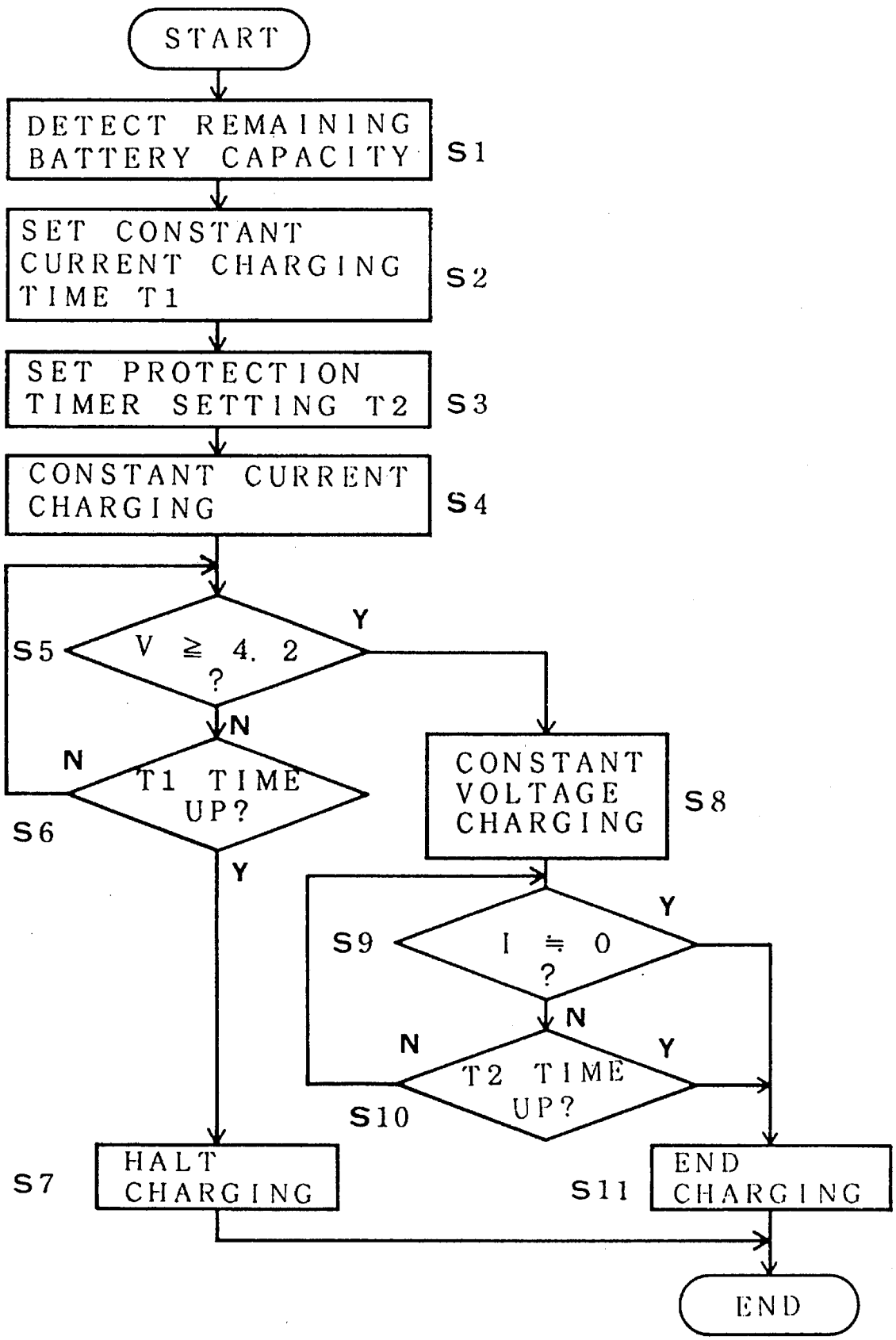
FIG. 4 is a flowchart showing the operation of a first embodiment of the battery charger of the present invention.

FIG. 4 is a flowchart indicating the operation of the previously described battery charger. When the battery charging operation is begun, the remaining capacity of battery B is detected in step S1. More specifically, in the present embodiment where the battery B is a rechargeable lithium ion battery, the remaining battery capacity and the battery voltage B are approximately proportional. Consequently, in this ease the remaining battery capacity is detected by measurement of the battery B voltage V by the voltage detection section 3.

In step S2, the time interval T1 of the constant current charging timer, which controls the constant current charging time of battery B, is set. The constant current charging time is short for a large remaining battery capacity and is long for a small remaining battery capacity. A suitable value for the constant current charging time is established and set in the timer circuit 5. Continuing, in step S3 the protection timer, which forces an end to the charging of battery B, is set to a time T2. Just as for the constant current charging time T1, this protection timer setting T2 is short for a large remaining battery capacity and is long for small remaining battery capacity, and a suitable value for T2 is established and set in the timer circuit 5.

In step S4, the constant current charging of battery B is commenced and 1C to 2C of constant current is supplied to battery B from the power supply section 2. At this point, the constant current charging timer and the protection timer simultaneously start counting.

In steps S5 and S6, while the constant current charging timer of the timer circuit 5 is counting, in other words after charging has begun but before the constant current charging time T1 has elapsed, the detection results from the voltage detection section 3 are judged to determine if the voltage V of the battery B has reached 4.2 V. If the battery voltage does not reach 4.2 V, a malfunction in battery B or in the battery charger is assumed after the constant current charging time T1 has elapses in step S7 and constant current charging is immediately halted with a charging malfunction displayed by the display section 6.

On the other hand, if the voltage V of the battery B reaches 4.2 V while the constant current charging timer is still counting, that is prior to an elapsed time since the start of charging equal to the constant current charging time T1, then the constant voltage charging of the battery B is started with the power supply section 2 supplying a constant voltage of 4.2 V to the battery B in step S8.

In steps S9 and S10, while the protection timer of the timer circuit 5 is counting, in other words before the protection time T2 has elapsed, the detection results from the current detection section 4. are judged to determine if the charging current I of the battery B has dropped to approximately zero. If the charging current I is judged to have dropped to approximately zero, the battery B is assumed to be fully charged, and in step S11 charging is ended at the same time a fully charged indication is presented by the display section 6.

On the other hand, if the protection timer of the timer circuit 5 times out in step S10, that is, the protection time T2 has elasped prior to the battery charging current I dropping to near zero, there is a forced transition to step S11 where charging is ended and a fully charged indication is presented by the display section 6.

In this case, although battery B has not reached a fully charged state, it is very close a to full charge. The battery B will not get closer a to full charge, and it is not maintained in a charging state continuously for a long period. In other words, the protection timer protects the battery B from being subjected to continuous charging for a long period to avoid a reduction of the battery lifetime by forcibly halting charging when the protection time T2 has elapsed.

In this fashion, the protection timer is set to a suitable length of time T2 according to the remaining battery capacity prior to charging. Namely, the protection time T2 is set to a short time for a large remaining battery capacity and is set to a long time for a small remaining battery capacity. Therefore, regardless of whether the battery B has a large or small remaining capacity, the protection timer is controlled with an optimum time setting T2.

For the case where the battery B is a nickel-cadmium battery or a nickel-hydrogen battery, there is no switching from constant current charging to constant voltage charging and only constant current charging takes place. In this case, only the protection timer setting T2 is set according to remaining battery capacity.

As described above, a battery charger that controls the protection timer setting T2 based on the remaining battery capacity measured by the battery capacity detector can set an optimal protection time regardless of the amount of remaining battery capacity and fully realize the function of the protection time.

Furthermore, since a battery charger with this structure measures remaining battery capacity with the battery capacity detector and from that result controls the constant current charging timer setting or the quasi-constant current charging time, it can set an optimal charging time regardless of the amount of remaining battery capacity and fully realize the function of the constant current charging time.

Figure 5:
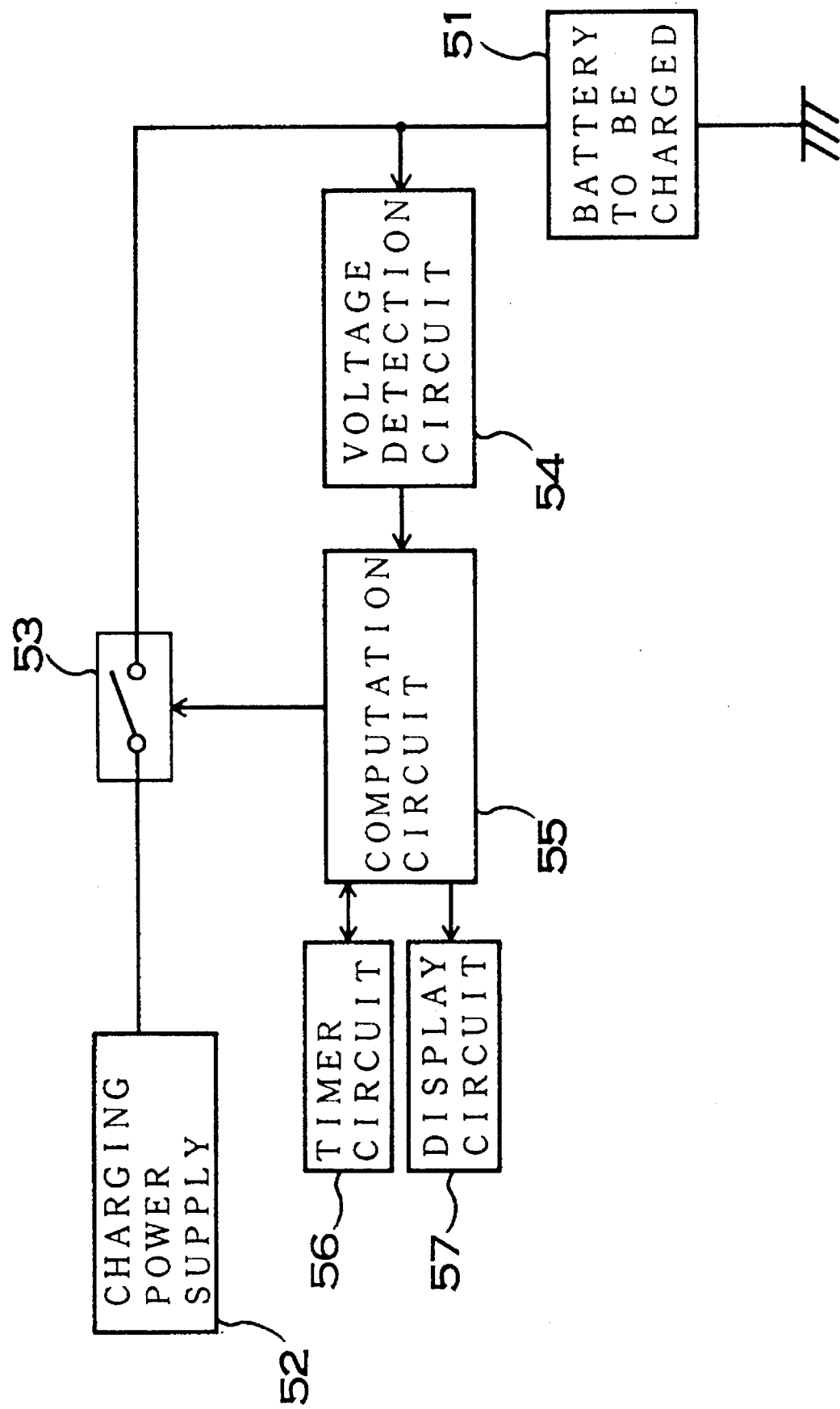
FIG. 5 is a block circuit diagram showing a second embodiment of the battery charger of the present invention.

In addition, the battery charger of the present invention can also detect the remaining battery capacity with a battery capacity detector that measures the constant current charging time of the battery. FIG. 5 is a block circuit diagram of a battery charger that realizes this. In this figure, element 51 is a rechargeable lithium ion battery.

Element 52 is a charging power supply that accepts AC from a commercial power source and supplies 1C to 2C of constant current or 4.2 V of constant voltage to the battery 51. This charging power supply 52 supplies a constant current to the battery 51 for constant current charging until the battery voltage reaches a prescribed value (for example, 4.2 V), then it supplies a constant voltage to the battery 51 for constant voltage charging. As described in the previous embodiment, quasi-constant current charging that gradually reduces current from 2C to 1C is possible instead of constant current charging. However, constant current charging is assumed in the following explanation.

Element 53 is a charging control switch disposed between the charging power supply 52 and the battery 51. Element 54 is a voltage detection circuit used to measure the voltage of the battery 51. Element 55 is a computation circuit composed of a microcomputer.

Element 56 is a timer circuit which counts elapsed time during constant current charging of the battery 51 and is provided with a constant current charging timer and a protection timer. The timer circuit 56 counts elapsed time during the constant current charging of the battery 51 to detect the remaining battery capacity. Therefore, the timer circuit 56 is the remaining battery capacity detector that measures the remaining battery capacity. Furthermore, the timer circuit 56 sets the constant current charging timer and protection timer settings according to the remaining battery capacity. Therefore, the timer circuit 56 is also the timer setter.

Element 57 is a display circuit of LED's and their driving circuitry used to indicate the completion of the charging of battery 51.

Figure 6:
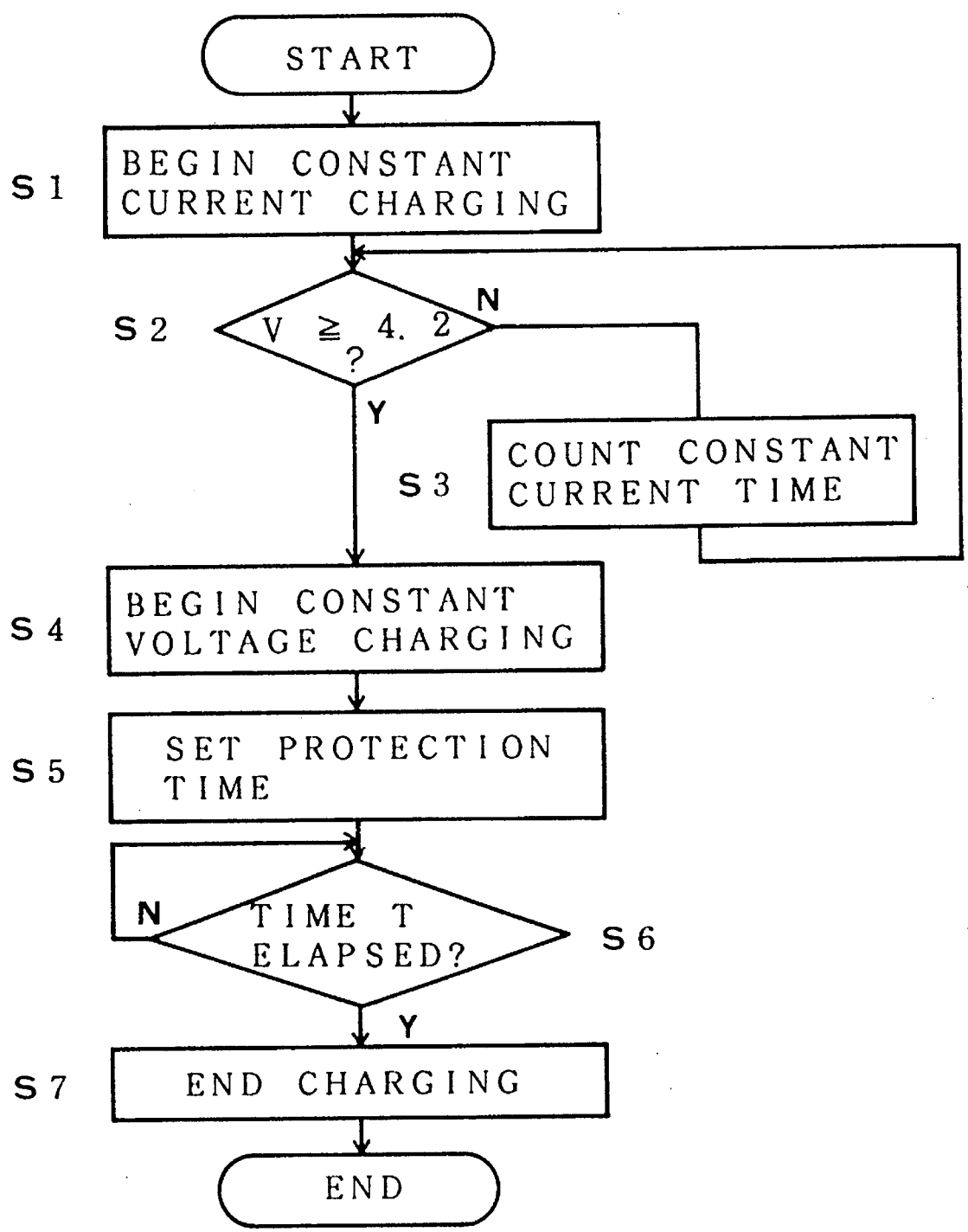
FIG. 6 is a flow-chart showing the operation of an embodiment of the battery charger of the present invention.

FIG. 6 is a flowchart showing the operation of the battery charger of FIG. 5. The following describes battery charging with reference to the waveforms of FIG. 7A–7B.

First in step S1, 1C to 2C of constant current is supplied from the charging power supply 52 to the battery 51 to begin constant current charging of the battery 51. At this time, the constant current charging timer of the timer circuit 56 begins counting the constant current charging time of the battery 51. In step S2, it is decided whether or not the voltage V of the battery 51 has reached the prescribed voltage of 4.2 V. In other words it is decided whether or not constant current charging of the battery 51 has been completed. If 4.2 V has not been reached, counting of the constant current charging time continues in step S3 and control returns to step S2.

When it is determined that the voltage V of the battery 51 has reached 4.2 V, that is, that constant current charging is complete, 4.2 V of constant voltage charging is begun in step S4. Further in step S5, the protection timer is set to time T based on the constant current charging time of the battery 51. For the ease where the battery 51 is not degraded by (charge-discharge) cycling, the constant current charging time is long (time T1 in FIG. 7B). For a cycling degraded battery 51, the internal impedance is large and the constant current charging time is short (time T2 in FIG. 7B). Consequently, the timer circuit 56 can detect battery capacity by detecting the constant current charging time. The timer circuit 56 determines the battery capacity from the constant current charging time T1 or T2 and based on that result sets the protection time T to TA or TB (TA<TB). In other words, the protection time T is set essentially inversely proportional to the constant current charging time.

After the protection timer setting T is set to TA or TB in this manner, constant voltage charging is continued in step S6 until the protection time T has elapsed. When the protection time T has elapsed, constant voltage charging is ended in step S7 and this is indicated by the display circuit 7.

Figure 8:
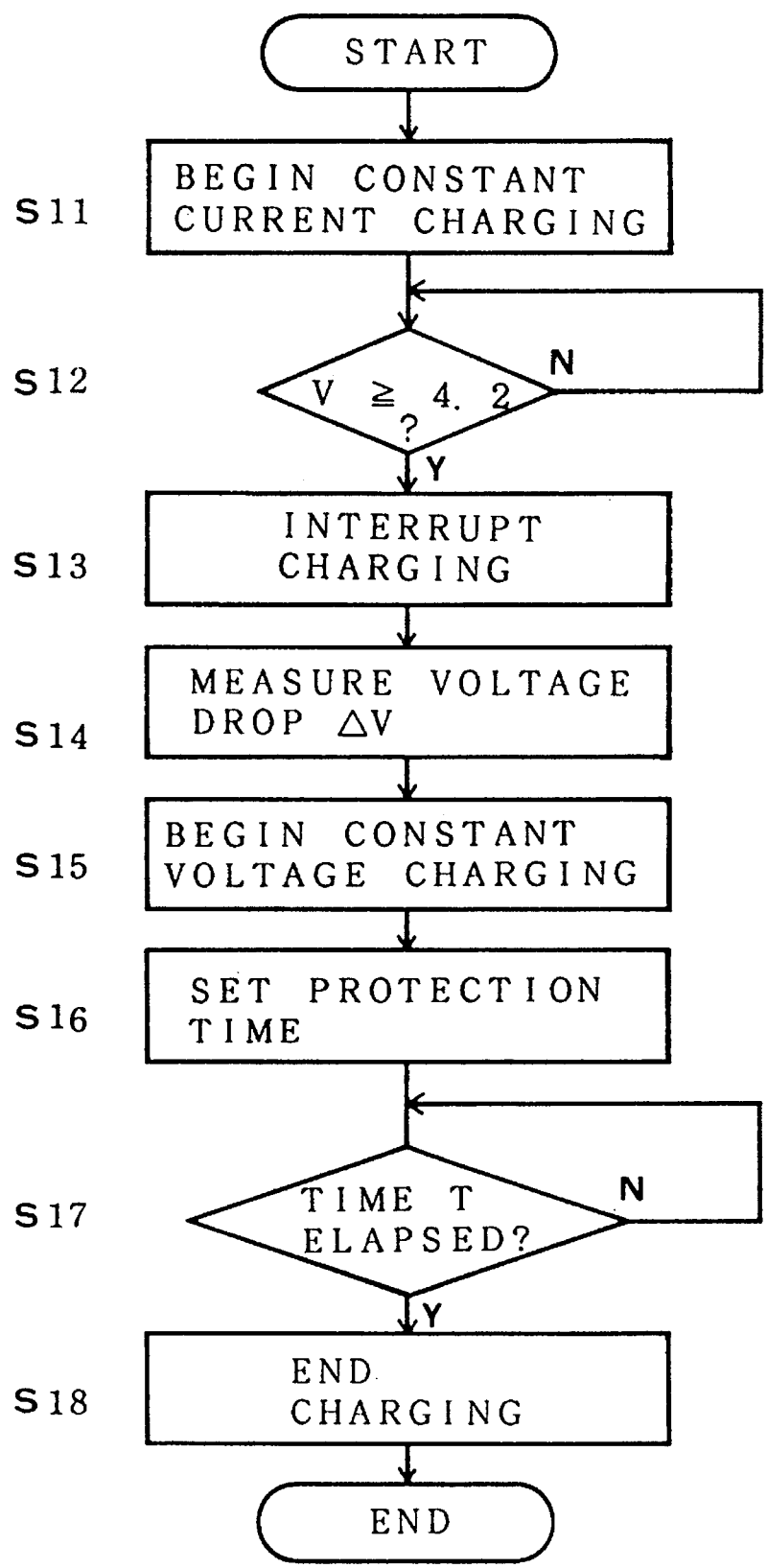
FIG. 8 is a flowchart showing the operation of an embodiment of the battery charger of the present invention.

In the battery charger shown in the block diagram of FIG. 5, the battery capacity can also be determined by a battery capacity detector that temporarily interrupts charging to measure the battery voltage drop at that time. To realize this, the battery is charged in accordance with the flowchart of FIG. 8. This is explained in the following with reference to the waveforms of FIG. 9A–9B.

First in step S11, 1C to 2C of constant current is supplied from the charging power supply 52 to the battery 51 to begin constant current charging of the battery 51. In step S12, constant current charging is continued until the voltage V of the battery 51 reaches the prescribed voltage of 4.2 V.

When it is judged that the voltage V of the battery 51 has reached 4.2 V in step S12, charging is interrupted in step S13 by temporarily turning the charging control switch 53 off. Next, in step S14, during the period of interrupted charging, the amount of battery voltage drop ΔV is measured by the voltage detection circuit 54. The computation circuit 55 processes the output from the voltage detection circuit 54 to compute the battery capacity. Therefore, in this ease, the battery capacity detector is made up of the voltage detection circuit and the computation circuit. The amount of battery voltage drop ΔV is small for a battery 51 without cycling degradation (ΔV1 in FIG. 9A) and large for a cycling degraded battery 51 which has a large internal impedance (ΔV2 in FIG. 9A).

After the battery voltage drop ΔV has been measured, constant voltage charging is begun in step S15. Then in step S16, the protection timer is set to TA or TB (TA<TB) depending on the battery voltage drop ΔV1 or ΔV2. In other words, the protection timer setting T is set almost inversely proportional to the battery voltage drop ΔV.

After TA or TB is set as the protection timer setting T in this manner, constant voltage charging is continued in step S17 until the protection time T has elapsed. When the protection time T has elapsed, constant voltage charging is ended in step S18 and the display circuit 57 indicates this.

As described above, the battery capacity is detected by measuring constant current charging time or quasi-constant current charging time or by interrupting charging after completion of constant current charging to measure battery voltage drop. Since a battery charger that sets the protection timer based on this detection result can establish an optimum protection time for that battery capacity, the battery can be reliably protected.

Figure 10A:
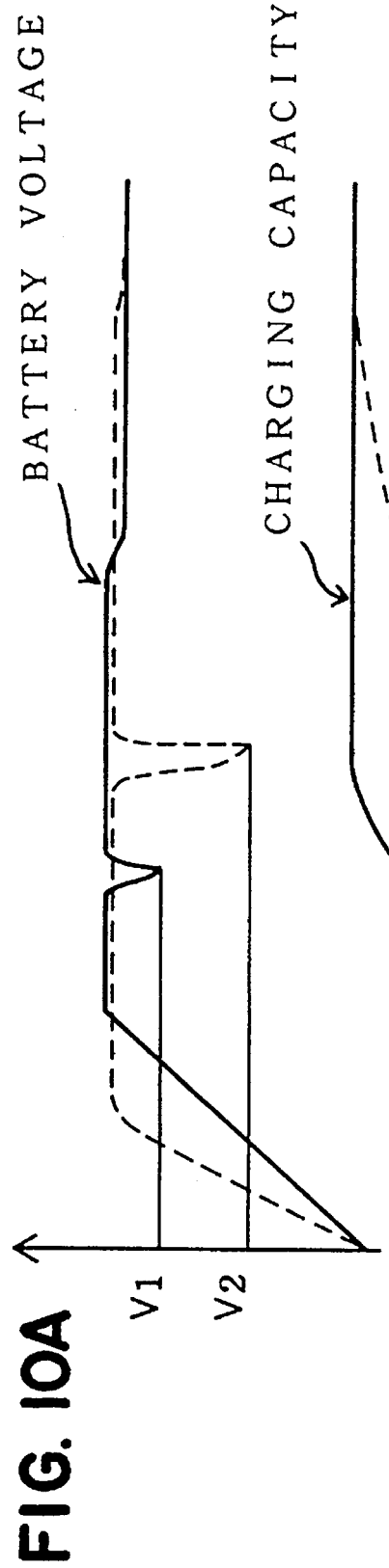
FIGS. 10A–10B are is graphs showing voltage, current, and battery capacity change during charging of a battery by an embodiment of the battery charger of the present invention.
Figure 10B:
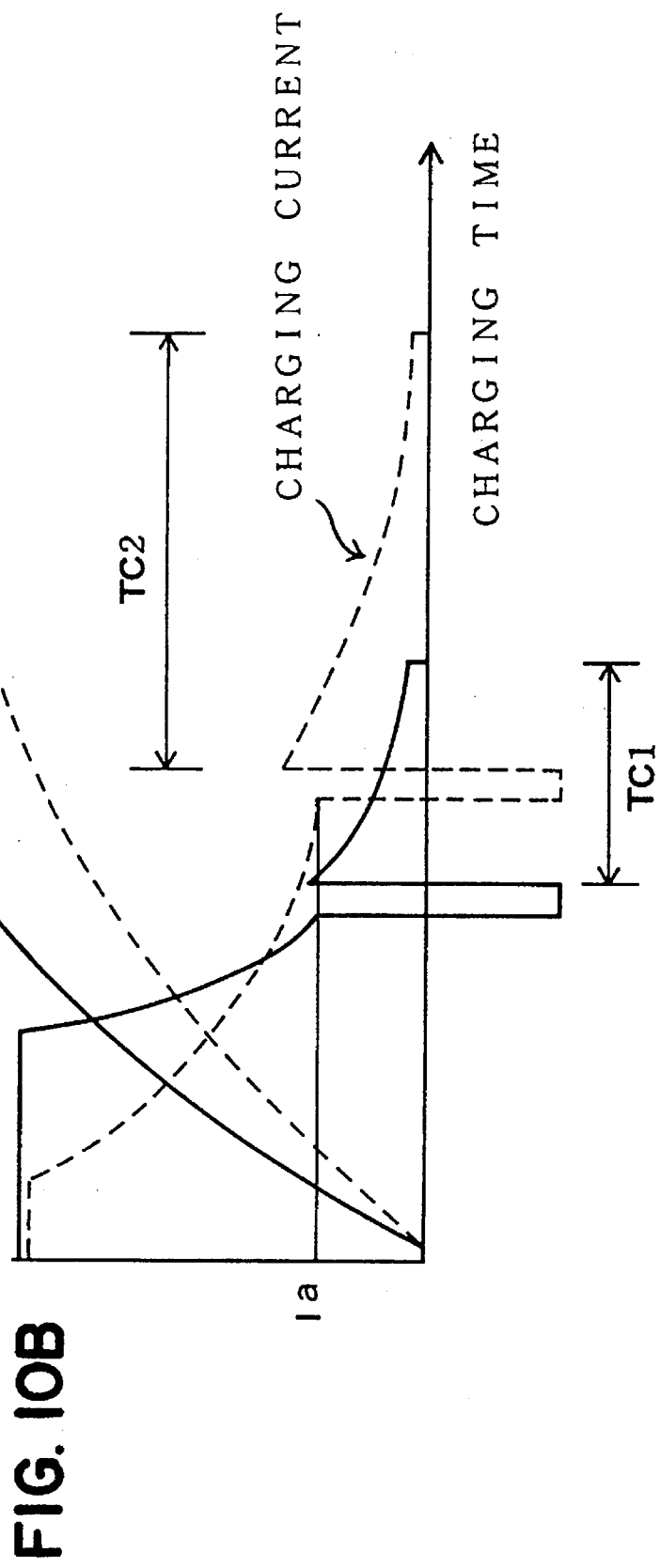

Battery capacity can also be detected by interrupting charging, allowing a pulsed discharge, and measuring the drop in battery voltage during the discharge. FIGS. 10A–10B show the voltage and current waveforms for this pulsed discharge battery capacity detection. If a battery is pulse discharged after charging for a fixed time, battery voltage will drop. As shown by the solid lines of FIGS. 10A–10B show a battery with large charging capacity has a small voltage drop during pulsed discharge. Conversely, as shown by the broken lines of FIGS. 10A–10B, a battery with a small charging capacity has a large voltage drop during pulsed discharge. Consequently, battery capacity can be detected from the pulsed discharge voltage drop and the timer setting can be revised. Since the charging capacity is large for a battery with a small pulsed discharge voltage drop (solid lines), the subsequent charging time TC1 can be short while protecting against over-charging. Since a battery with a large pulsed discharge voltage drop (broken lines) has a small charging capacity, the subsequent charging time TC2 is made long to achieve a full charge.

Figure 11:
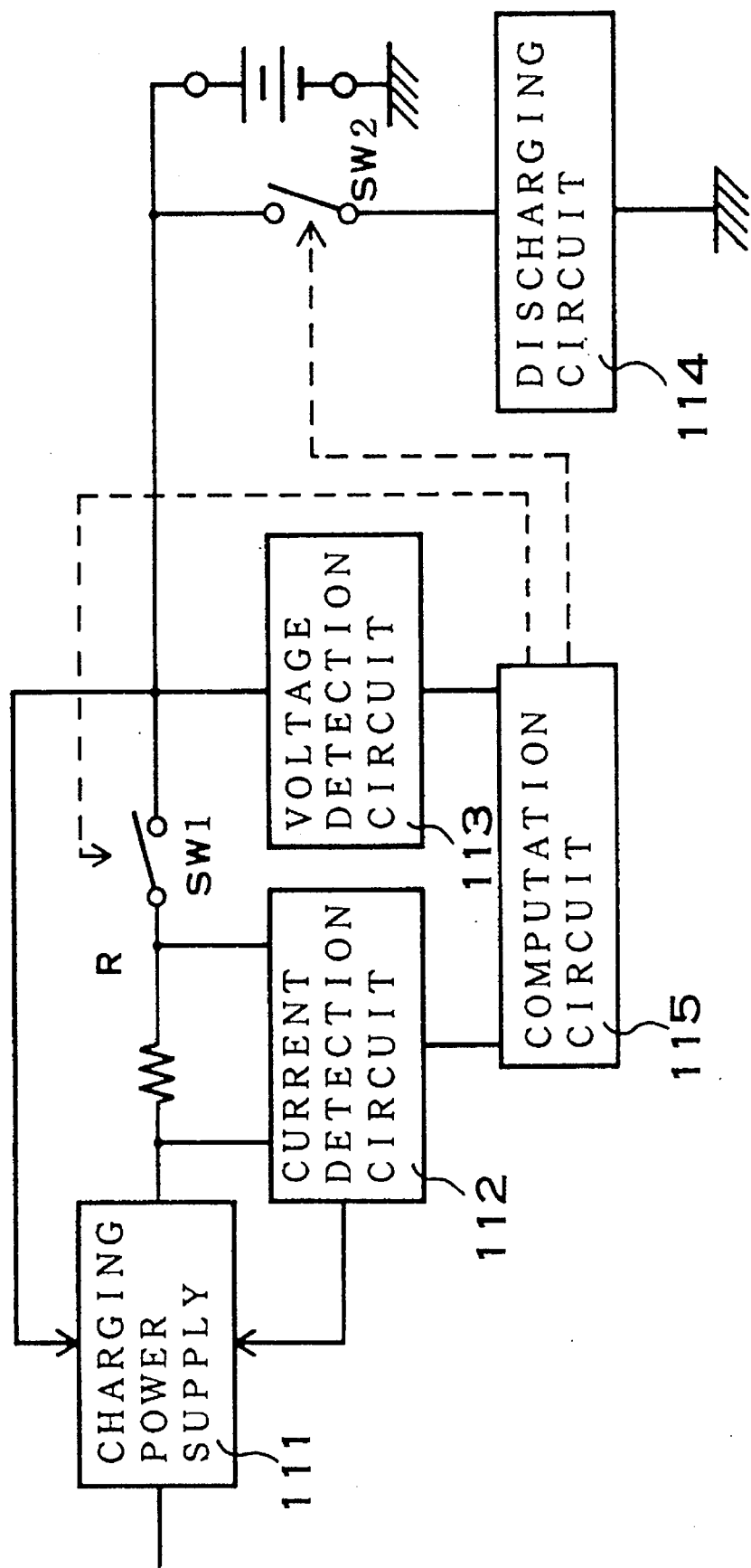
FIG. 11 is a block circuit diagram showing an embodiment of the battery charger of the present invention.

FIG. 11 is a block circuit diagram of a battery charger to realize this. The battery charger shown in FIG. 11 comprises a charging power supply 111, a main switch SW1 to interrupt charging, a discharge switch SW2 to pulse discharge the battery, a discharging circuit 114 connected in series with the discharge switch SW2 to control discharge current, a current detection circuit 112 to measure the battery charging current, a voltage detection circuit 113 to measure the battery voltage, and a computation circuit 115 to set the time for subsequent charging after battery capacity detection from the voltage drop during pulsed discharge.

This battery charger pulse discharges the battery, detects the drop in battery voltage, and computes battery capacity from that voltage drop. Consequently, the battery capacity detector of this battery charger is made up of the voltage detection circuit 113 that measures battery voltage drop and the computation circuit 115 that computes battery capacity from the voltage drop. Furthermore, the computation circuit 115 has an internal timer for timing subsequent charging, and the computation circuit 115 controls that timer setting according to battery capacity. Therefore, the computation circuit 115 is also the timer setter to control the subsequent charging time interval depending on battery capacity.

The charging power supply 111 performs constant voltage charging after the battery voltage rises to the prescribed level during constant current charging. Consequently, the charging power supply 111 switches from constant current charging to constant voltage charging the when battery voltage is detected to rise above the prescribed value.

The main switch SW1 is turned on for battery charging and is turned off when the battery is fully charged and charging is ended. The main switch SW1 is turned on and off by the computation circuit 115 control.

The discharge switch SW2 and the discharging circuit 114 are connected in series and pulse discharge the battery. When the discharge switch SW2 is turned on, the battery discharges through the discharge switch SW2 and the discharging circuit 14. The battery is not discharged with the discharge switch SW2 in the off state. Turning the discharge switch SW2 on and off is controlled by the computation circuit 115. Since the discharge switch SW2 discharges the battery in a pulsing manner, its on time is set short, for example in a 0.5 to 5 sec. range. The discharging circuit 114 regulates battery discharge current and semiconductor devices such as resistors, transistors, and field effect transistors (FETs) are used in this circuit.

The current detection circuit 112 measures battery charging current by measuring the voltage across of a current detection resistor R connected in series with the battery. The current detection circuit 112 inputs the detected current value to the computation circuit 115. The voltage detection circuit 113 measures battery voltage and inputs it to the computation circuit 115.

The computation circuit 115 processes the input signals from the current detection circuit 112 and the voltage detection circuit 113 and controls the main switch SW1 and the discharge switch SW2. During pulsed discharge, the discharge switch SW2 is switched on, and when the battery is fully charged, the main switch SW1 is switched off.

Figure 12:
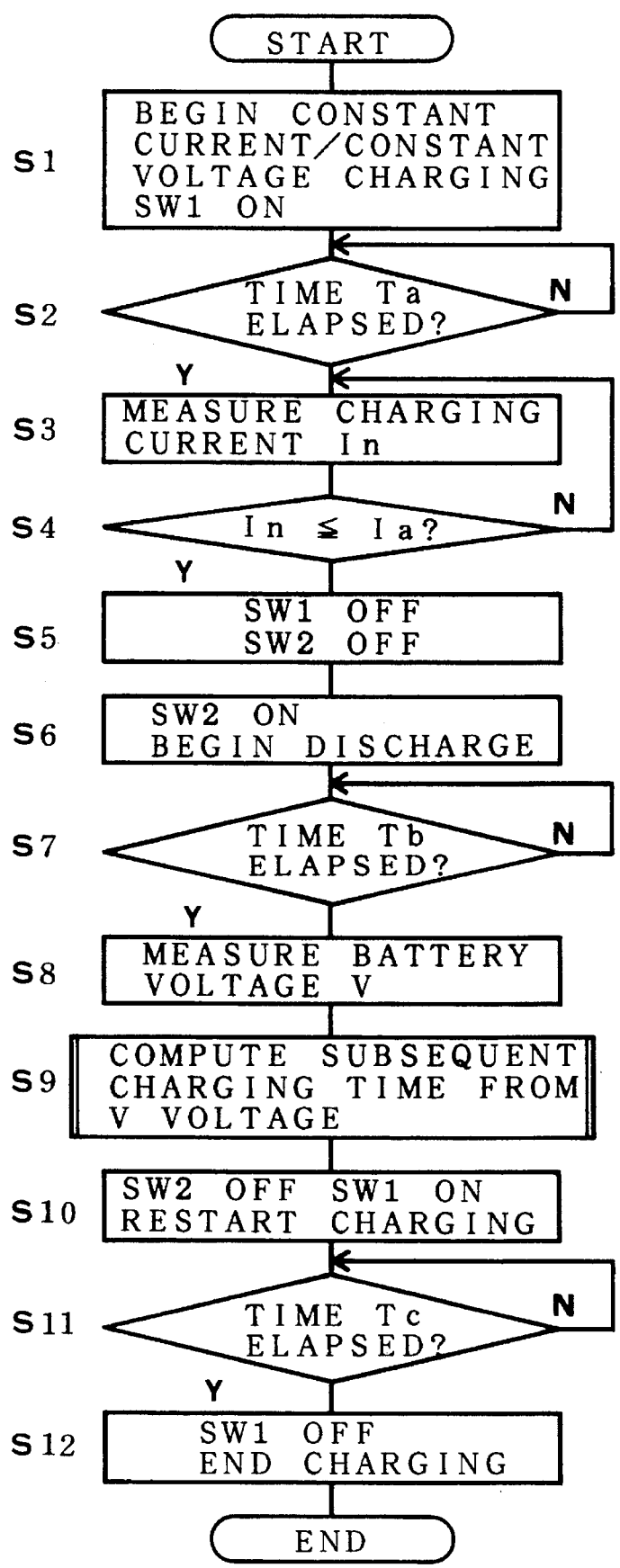
FIG. 12 is a flowchart showing charging of a battery by an embodiment of the battery charger of the present invention.

The battery charging circuit shown in FIG. 11 charges a battery in accordance with the flowchart of FIG. 12.

[step S1]

Turn on the main switch SW1 and perform constant current charging of the battery. After the set voltage is reached, perform constant voltage charging. In this state, the computation circuit 115 has the discharge switch SW2 turned off.

[step S2]

The no-sense time Ta is judged to have elapsed or not. The no-sense time interval is provided to ignore start-up transients in the charging current. Although it is not illustrated, the timer to count off the no-sense interval is internal to the computation circuit 115.

[step S3]

The current detection circuit 112 measures the battery charging current (In) and inputs it to the computation circuit 115.

[step S4]

The computation circuit 115 compares the detected charging current (In) with a set current value (Ia). As shown in FIG. 10, the set current value (Ia) is determined by the current value for beginning pulsed discharge. The set current value (Ia) is stored in the computation circuit 115 memory. If the charging current (In) is larger than the set current value (Ia), control loops back to S3. If the charging current (In) is less than the set current value (Ia), control moves to the next step since the battery is approaching full charge.

[step S5]

The main switch SW1, controlled by the computation circuit 115, is turned off, and the discharge switch SW2 is maintained in the off state.

[step S6]

The computation circuit 115 switches the discharge switch SW2 on to pulse discharge the battery.

[step S7]

This step is executed in a loop until the discharge switch SW2 on time (Tb) has elapsed. This pulse discharge time (Tb) is set to a short interval. This is because a long pulse discharge time would result in lengthening subsequent charging time. The pulse discharge time (Tb) is set, for example, to 0.5 to 5 sec.

[step S8]

The voltage detection circuit 113 measures battery voltage and inputs the detection signal to the computation circuit 115.

[step S9]

The computation circuit 115 computes battery capacity from the input voltage level and subsequent charging time (Tc) for the timer from the battery capacity. As shown in FIGS. 10A–10B, the subsequent charging time (Tc) is set long for a low detected voltage (broken lines) and is set short for a high detected voltage (solid lines). Since the battery shown by solid line characteristics in FIGS. 10A–10B has a high voltage (V1) after the pulsed discharge voltage drop, its subsequent charging time (Tc1) is set to a short interval. Since the battery shown by broken line characteristics in FIGS. 10A–10B has a low voltage (V1) after the pulsed discharge voltage drop, its subsequent charging time (Tc1) is set to a long interval.

[step S10]

The computation circuit 115 turns the discharge switch SW2 off to stop discharge and the main switch SW1 on to restart charging.

[step S11]

The computation circuit 115 judges whether or not the subsequent charging time (Tc) has elapsed. This step is executed in a loop until the subsequent charging time (Tc) has elapsed.

[step S12]

When the subsequent charging time (Tc) has elapsed, the main switch SW1 is turned off and charging is ended. At this point the battery is fully charged.

In this charging method, when the battery charging current has decreased to a set value, the battery is pulse discharged and its voltage drop is detected. This method can calculate a subsequent charging time to bring the battery to an essentially fully charged state. Therefore, it has the feature that full charge to state that is optimal for battery performance can be obtained by shortening subsequent charging time.

The battery charging method of the flowchart in FIG. 12 measures the battery voltage drop with the discharge switch SW2 on. In other words, the battery voltage is measured while discharge takes place. The battery charger of the present invention can also measure battery voltage after completion of pulse discharge and while the battery is not being charged to compute subsequent charging time.

Furthermore, as shown in FIGS. 13A–13B, the battery charger of the present invention can also pulse discharge the battery and compute subsequent charging time after a fixed time has elapsed since the beginning of charging. This method charges a battery by the following steps corresponding to the flowchart of FIG. 14.

[step S1]

The computation circuit 115 turns the main switch SW1 on to perform constant current charging of the battery. After the set voltage is reached, constant voltage charging is performed. In this state, the computation circuit 115 has the discharge switch SW2 turned off.

[step S2]

The timer setting to begin pulsed discharge (TA) is judged to have elapsed or not. This step is executed in a loop until the timer setting (TA) has elapsed. The time setting (TA) is established such that no battery will be fully charged but will be close to full charge.

[step S3]

The main switch Sw1 is turned off by computation circuit 115 control. Consequently, charging is interrupted. The discharge switch SW2 is maintained in the off state. ['step S4]

The computation circuit 115 switches the discharge switch SW2 on to pulse discharge the battery.

[step S5]

This step is executed in a loop until the discharge switch SW2 on time (Tb) has elapsed. This pulse discharge time (Tb) is set to a short interval. This is because a long pulse discharge time would result in lengthening subsequent charging time. The pulse discharge time (Tb) is set, for example, to 0.5 to 5 sec.

[step S6]

The voltage detection circuit 113 measures battery voltage and inputs the detection signal to the computation circuit 115.

[step S7]

The computation circuit 115 computes battery capacity from the input voltage level and subsequent charging time (Tc) for the timer from the battery capacity. The subsequent charging time (Tc) is set long for a low detected voltage and is set short for a high detected voltage.

[step S8]

The computation circuit 115 turns the discharge switch SW2 off to stop discharge and the main switch SW1 on to restart charging.

[step S9]

The computation circuit 115 judges whether or not the subsequent charging time (Tc) has elapsed. This step is executed in a loop until the subsequent charging time (Tc) has elapsed.

[step S10]

When the subsequent charging time (Tc) has elapsed, the main switch SW1 is turned off and charging is ended. At this point the battery is fully charged.

Figure 14:
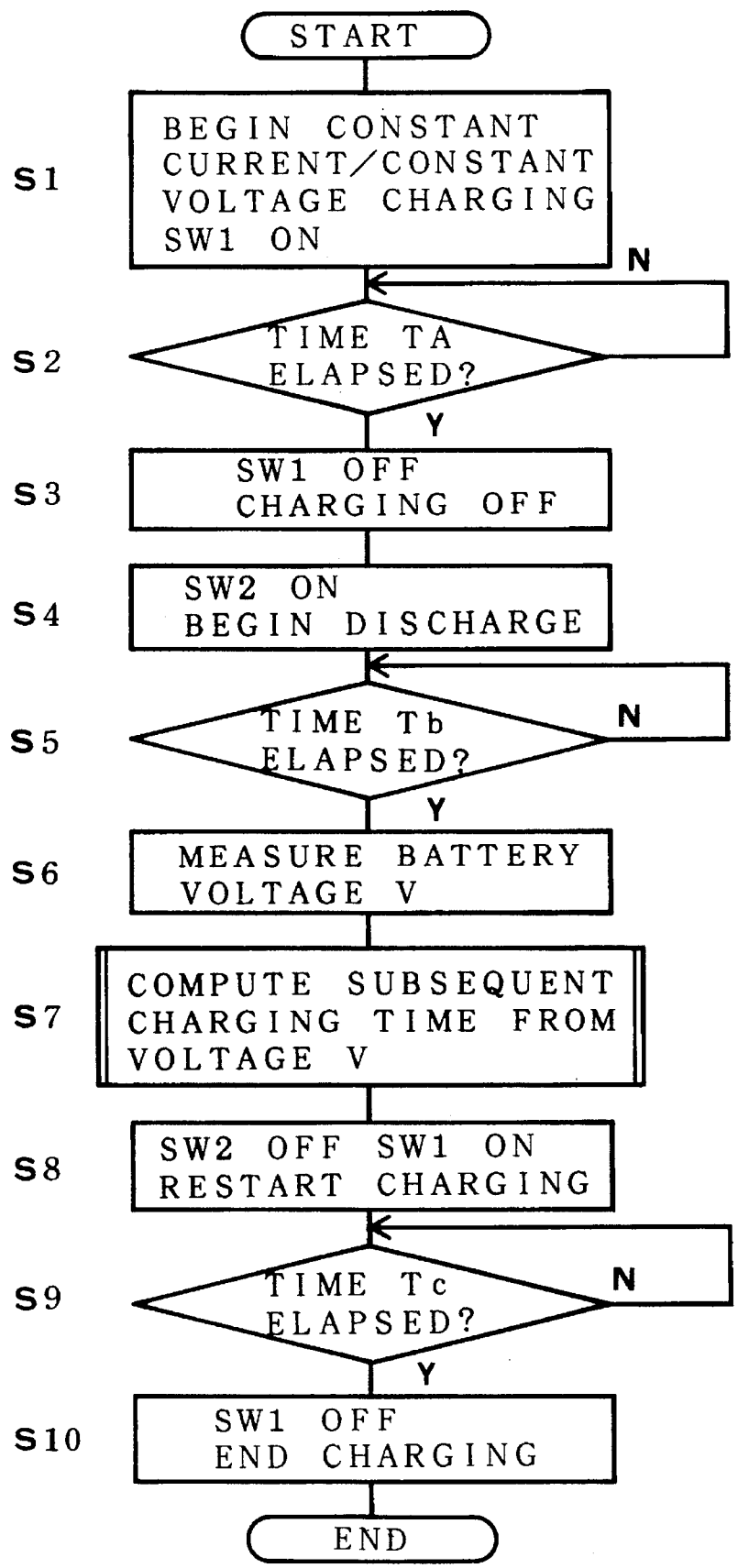
FIG. 14 is a flowchart showing charging of a battery in accordance with the graphs shown in FIGS. 13A–13B.

Since charging is interrupted and pulsed discharge performed when a fixed time has elapsed from the start of charging in the flowchart of FIG. 14, it is not necessary to measure the charging current prior to pulsed discharge. Therefore, this battery charger has the feature that the current detection circuit 112 to measure battery charging current is unnecessary and circuit structure is simplified.

Figure 15A:
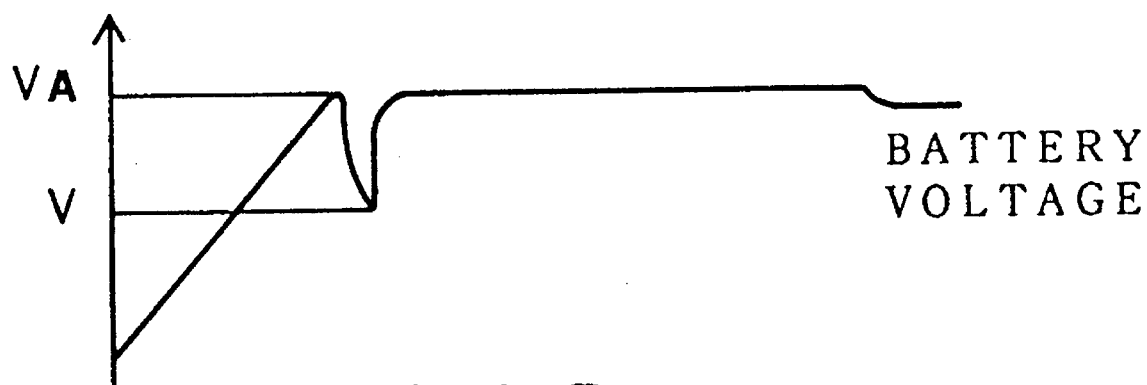
FIGS. 15A–15B are is graphs showing voltage and current change during charging of a battery by an embodiment of the battery charger of the present invention.
Figure 15B:
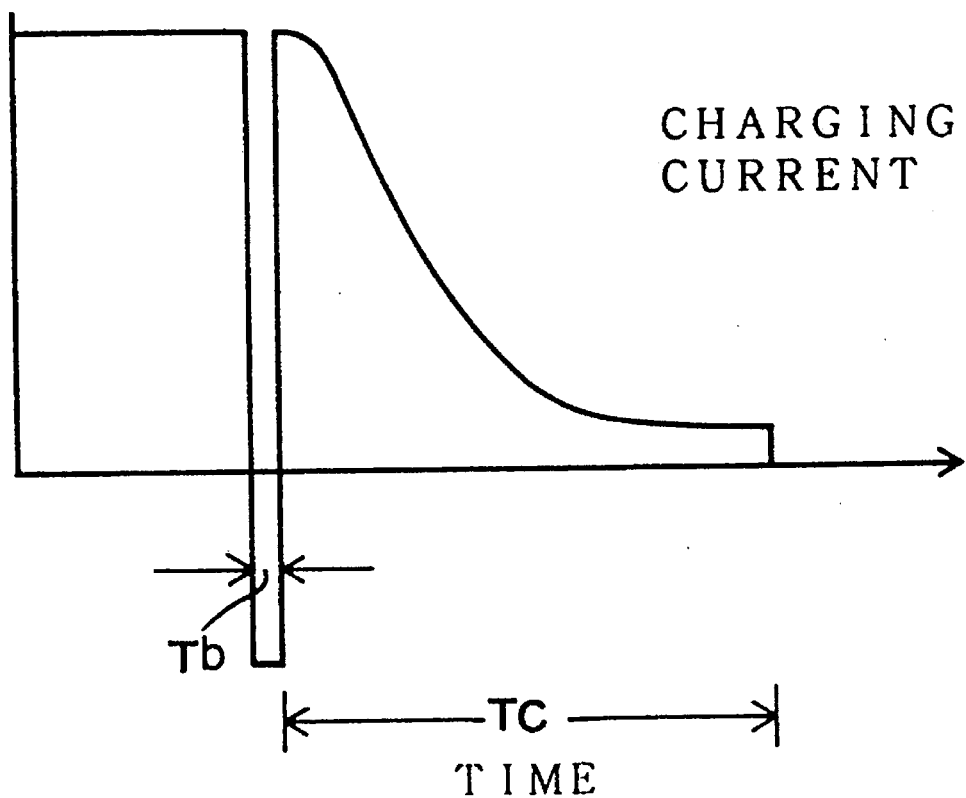

Further, as shown in FIGS. 15A—15A, the battery charger of the present invention can also pulse discharge the battery and compute subsequent charging time after charging is started and the battery voltage has risen to a fixed voltage (VA). This method charges a battery by the following steps corresponding to the flowchart of FIG. 16.

[step S1]

The computation circuit 115 turns the main switch SW1 on to perform constant current charging of the battery. After the set voltage is reached, constant voltage charging is performed. In this state, the computation circuit 115 has the discharge switch SW2 turned off.

[step S2]

The voltage detection circuit 113 measures battery voltage (Vn) and inputs the detection signal to the computation circuit 115.

[step S3]

The computation circuit 115 compares the input battery voltage (Vn) with the voltage set to begin pulsed discharge (VA). If the battery voltage (Vn) is lower than the set voltage (VA), control loops back to step S2. If the battery voltage (Vn) is greater than or equal to the set voltage (VA), control moves to the next step. The voltage (VA) is the voltage set to begin pulsed discharge when the battery voltage reaches the value thereof, and it is stored in computation circuit 115 memory.

[step S4]

The main switch SW1 is turned off by computation circuit 115 control. Consequently, charging is interrupted. After this, the computation circuit 115 switches the discharge switch SW2 on to pulse discharge the battery.

[step S5]

This step is executed in a loop until the discharge switch SW2 on time (Tb) has elapsed. This pulse discharge time (Tb) is set to a short interval. This is because a long pulse discharge time would result in lengthening subsequent charging time. The pulse discharge time (Tb) is set, for example, to 0.5 to 5 sec.

[step S6]

The voltage detection circuit 113 measures battery voltage and inputs the detection signal to the computation circuit 115.

[step S7]

The computation circuit 115 computes subsequent charging time (Tc) from the input voltage level. The subsequent charging time (Tc) is set long for a low detected voltage and is set short for a high detected voltage.

[step S8]

The computation circuit 115 turns the discharge switch SW2 off to stop the discharge and the main switch SW1 on to restart charging.

[step S9]

The computation circuit 115 judges whether or not the subsequent charging time (Tc) has elapsed. This step is executed in a loop until the subsequent charging time (Tc) has elapsed.

[step S10]

When the subsequent charging time (Tc) has elapsed, the main switch SW1 is turned off and charging is ended. At this point the battery is fully charged.

Figure 16:
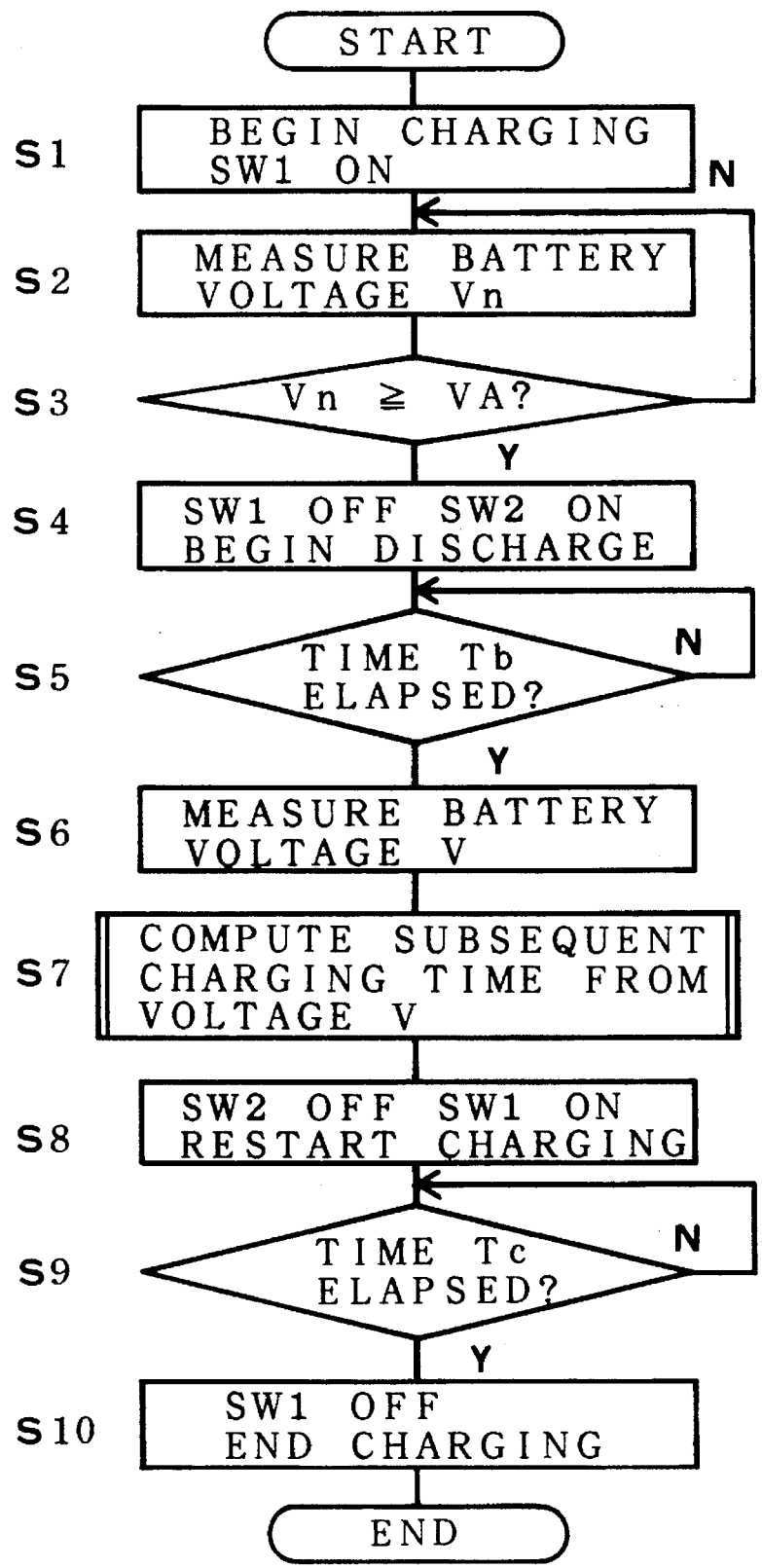
FIG. 16 is a flowchart showing charging of a battery in accordance with the graphs shown in FIGS. 15A–15B.

Since charging is interrupted and pulsed discharge performed when battery voltage has risen to a set value after the start of charging in the flowchart of FIG. 16, as in the flowchart of FIG. 14 it is not necessary to measure the charging current prior to pulsed discharge. Therefore, this battery charger also has the feature that the current detection circuit 112 to measure battery charging current is unnecessary and the circuit structure is simplified.

Figure 17A:
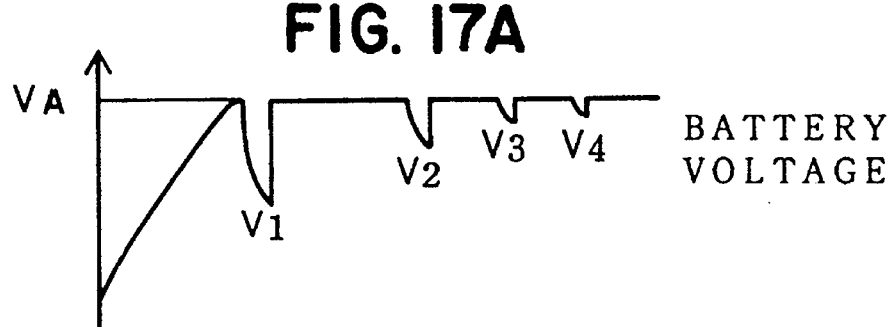
FIGS. 17A–17B are is graphs showing voltage and current change during charging of a battery by an embodiment of the battery charger of the present invention.
Figure 17B:
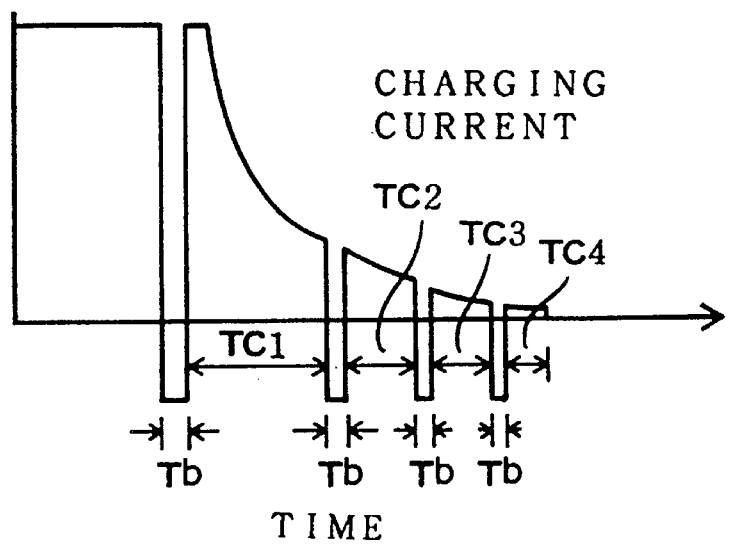
Figure 18:
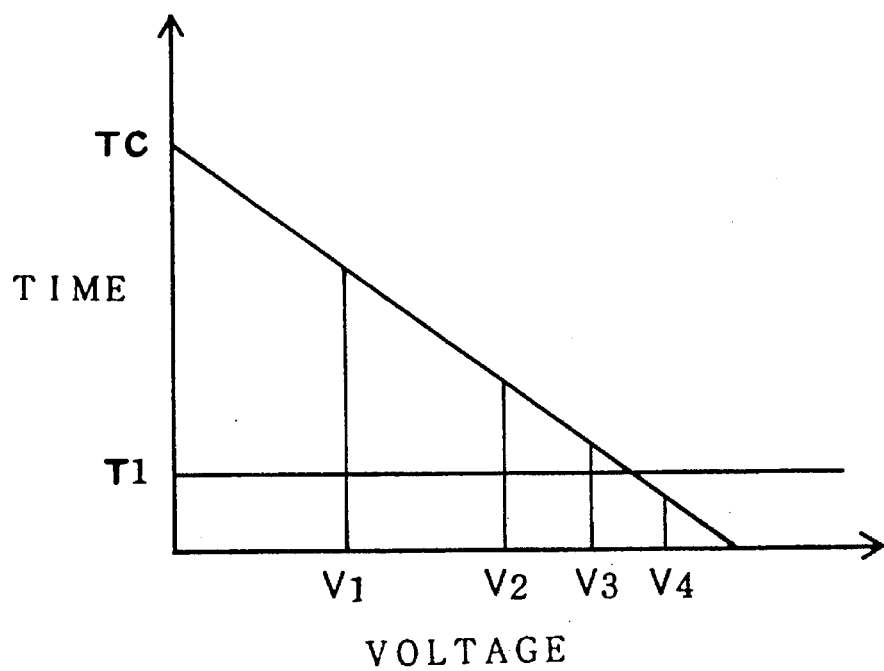
FIG. 18 is a graph showing an example of the computation circuit calculation of the recharging time during battery charging with the characteristics shown in FIGS. 17A–17B.

Furthermore, as shown in FIGS. 17A–17B, the battery charger of the present invention can also perform a plurality of pulsed discharges after the battery voltage has reached the set voltage (VA) and repeatedly perform charging after each discharge. In this case, as shown in FIG. 18, subsequent charging time is computed from the battery voltage (Vn) after the pulsed discharge voltage drop. FIG. 18 shows that as the voltage at pulsed discharge gets higher, the subsequent charging time gets shorter. As the battery approaches full charge, the voltage at pulsed discharge gets higher. For this reason, as the battery approaches full charge, the subsequent charging time is shortened, and when the subsequent charging time becomes less than a prescribed time, it is set to zero. In other words, charging is ended.

Figure 19:
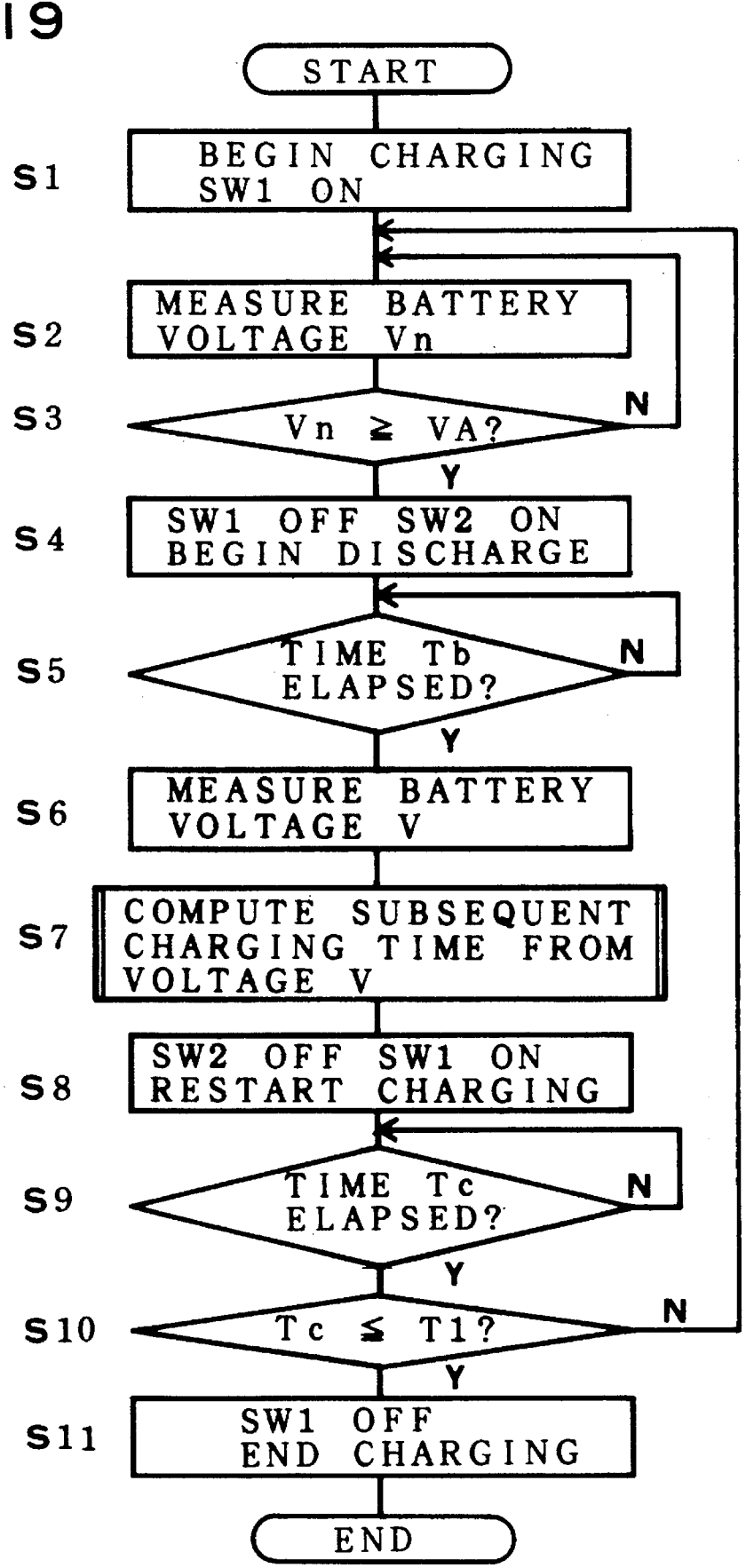
FIG. 19 is a flowchart showing charging of a battery with the voltage and current characteristics shown in FIGS. 17A–17B.

This method charges a battery by the following steps corresponding to the flowchart of FIG. 19.

[step S1]

The computation circuit 115 turns the main switch SW1 on to perform constant current charging of the battery. After the set voltage is reached, constant voltage charging is performed. In this state, the computation circuit 115 has the discharge switch SW2 turned off.

[step S2]

The voltage detection circuit 113 measures battery voltage (Vn) and inputs the detection signal to the computation circuit 115.

[step S3]

The computation circuit 115 compares the input battery voltage (Vn) with the voltage setting (VA). If the battery voltage (Vn) is lower than the set voltage (VA), control loops back to step S2. If the battery voltage (Vn) is greater than or equal to the set voltage (VA), control moves to the next step.

[step S4]

The computation circuit 115 turns off the main switch SW1, and after charging is interrupted the discharge switch SW2 is turned on to begin pulsed discharge.

[step S5]

This step is executed in a loop until the discharge switch SW2 on time (Tb) has elapsed.

[step S6]

The voltage detection circuit 113 measures battery voltage and inputs the detection signal to the computation circuit 115.

[step S7]

The computation circuit 115 computes battery capacity from the input voltage (Vn) and subsequent charging time (Tc) for a the timer from the battery capacity. As shown in FIG. 18, the subsequent charging time (Tc) is set long for low detected voltage (Vn), short for considerable charging and a high detected voltage (Vn), and zero when higher than a set value.

[step S8]

The computation circuit 115 turns the discharge switch SW2 off to stop discharge and the main switch SW1 on to restart charging.

[step S9]

The computation circuit 115 judges whether or not the subsequent charging time (Tc) has elapsed. This step is executed in a loop until the subsequent charging time (Tc) has elapsed.

[step S10]

When the subsequent charging time (Tc) has elapsed, it is judged whether or not it is shorter than a previously set time (T1). The set time (T1) is provided to end repeated charging when battery charging has proceeded to a point where the subsequent charging time is less than a prescribed value.

[step S11]

When the subsequent charging time computed by the computation circuit 115 becomes less than the set time, the main switch SW1 is turned off and charging is ended. At this point the battery is fully charged.

A battery charger that charges batteries in the above fashion has the feature that all batteries can be charged fully without over-charging. This is because a battery is pulse discharged during charging to determine battery capacity and subsequent charging time is adjusted depending on the battery capacity determined. Consequently, this battery charger has the feature that a battery that has a real change in capacity or different ambient temperature can be fully charged while preventing over-charging.

Still further, the above described battery charger does not need to detect minute currents during constant voltage charging to end charging as in prior art apparatus. This is because battery charging capacity is determined from battery voltage during pulsed discharge and used to adjust subsequent charging time. Therefore, this battery charger also has the feature that even though ideal full charging can be achieved, a high resolution, complex, and expensive circuit is not required to measure very small charging currents, and a simple inexpensive circuit can charge batteries normally.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

We claim:

1. A battery charger for charging a battery, said charger comprising:

a power source for supplying a charging current to the battery;

a charging state detector connected to the battery for detecting a charging state of the battery;

a timer connected to said charging state detector for setting a charging time according to a detection results of said charging state detector; and a controller connected to said power source for controlling said charging current supplied from said power source to the battery according to said charging time determined by said timer;

wherein said controller temporarily halts charging of the battery and applies a load to the battery and wherein said charging state detector comprises a voltage detector for detecting a battery voltage drop of the battery under load when battery charging is temporarily halted by said controller and a computation circuit for computing said charging state of the battery in response to said detected voltage drop of said voltage detector.

2. A battery charger for charging a battery, said charger comprising:

a power source for supplying a charging current to the battery;

a charging state detector connected to the battery for detecting a charging state of the battery;

a timer connected to said charging state detector for setting a charging time according to a detection results of said charging state detector; and a controller connected to said power source for controlling said charging current supplied from said power source to the battery according to said charging time determined by said timer;

wherein said controller temporarily halts charging of the battery and effects a temporary pulse discharge of the battery and wherein said charging state detector comprises a voltage detector for detecting a battery voltage drop during a temporary pulse discharge of the battery effected by said controller and a computation circuit for computing said charging state of the battery in response to said detected voltage drop from said voltage detector.

3. A battery charger for charging a battery, said charger comprising:

a power source for supplying a charging current to the battery;

said power source being in one of a constant current charging mode and a quasi-constant current charging mode until a battery voltage of the battery reaches a prescribed voltage and then being in a constant voltage charging mode;

a charging state detector connected to the battery for detecting a charging state of the battery;

a timer connected to the charging states detector for setting a charging time according to a detection results of said charging state detector; and a controller connected to said power source for controlling said charging current supplied from said power source to the battery according to said charging time determined by said timer;

wherein said charging state detector comprises a computation circuit for detecting said charging time of the battery in both said constant current charging mode and said quasi-constant current charging mode and for computing said charging state of the battery in response thereto.

4. A battery charger for charging a battery, said charger comprising:

a power source for supplying a charging current to the battery;

said power source being in one of a constant current charging mode and a quasi-constant current charging mode until a battery voltage of the battery reaches a prescribed voltage and then being in a constant voltage charging mode;

a charging state detector connected to the battery for detecting a charging state of the battery;

a timer connected to the charging states detector for setting a charging time according to a detection results of said charging state detector; and a controller connected to said power source for controlling said charging current supplied from said power source to the battery according to said charging time determined by said timer;

wherein said controller temporarily halts charging of the battery and applies a load to the battery and wherein said charging state detector comprises a voltage detector for detecting a battery voltage drop of the battery under load when battery charging is temporarily halted by said controller and a computation circuit for computing said charging state of the battery in response to said detected voltage drop of said voltage detector.

5. A battery charger for charging a battery, said charger comprising:

a power source for supplying a charging current to the battery;

said power source being in one of a constant current charging mode and a quasi-constant current charging mode until a battery voltage of the battery reaches a prescribed voltage and then being in a constant voltage charging mode;

a charging state detector connected to the battery for detecting a charging state of the battery;

a timer connected to the charging states detector for setting a charging time according to a detection results of said charging state detector; and a controller connected to said power source for controlling said charging current supplied from said power source to the battery according to said charging time determined by said timer;

wherein said controller temporarily halts charging of the battery and effects a temporary pulse discharge of the battery and wherein said charging state detector comprises a voltage detector for detecting a battery voltage drop for a temporary pulse discharge of the battery effected by said controller and a computation circuit for computing said charging state of the battery in response to said detected voltage drop of said voltage detector.

* * * * *